(12) United States Patent
Tsirline et al.

(10) Patent No.: US 9,108,434 B2
(45) Date of Patent: Aug. 18, 2015

(54) RFID NEAR-FIELD ANTENNA AND ASSOCIATED SYSTEMS

(75) Inventors: Boris Y. Tsirline, Glenview, IL (US); Karl Torchalski, Arlington Heights, IL (US)

(73) Assignee: ZIH Corp., Lincolnshire, IL (US)

( * ) Notice: Subject to any disclaimer, the term of this patent is extended or adjusted under 35 U.S.C. 154(b) by 2186 days.

(21) Appl. No.: 11/959,033

(22) Filed: Dec. 18, 2007

(65) Prior Publication Data
US 2009/0152353 A1 Jun. 18, 2009

(51) Int. Cl.
| | |
|---|---|
| G06K 7/00 | (2006.01) |
| B41J 3/50 | (2006.01) |
| G06K 7/10 | (2006.01) |
| G06K 17/00 | (2006.01) |

(52) U.S. Cl.
CPC ............... B41J 3/50 (2013.01); G06K 7/0008 (2013.01); G06K 7/10316 (2013.01); G06K 17/00 (2013.01); G06K 17/0025 (2013.01)

(58) Field of Classification Search
USPC .............................................. 235/439; 347/2
See application file for complete search history.

(56) References Cited

U.S. PATENT DOCUMENTS

| | | | |
|---|---|---|---|
| 2,812,501 A | 11/1957 | Sommers | |
| 3,665,480 A | 5/1972 | Fassett | |
| 3,742,319 A | 6/1973 | Bryan et al. | |
| 4,063,249 A * | 12/1977 | Bergander et al. | 343/756 |
| 4,371,876 A | 2/1983 | Nash | |
| 4,509,039 A | 4/1985 | Dowdle | |
| 5,006,812 A | 4/1991 | Erickson | |
| 5,192,954 A | 3/1993 | Brockelsby et al. | |
| 5,278,571 A | 1/1994 | Helfrick | |
| 5,294,931 A | 3/1994 | Meier | |
| 5,317,646 A | 5/1994 | Sang, Jr. et al. | |
| 5,369,381 A * | 11/1994 | Gamand | 333/161 |

(Continued)

FOREIGN PATENT DOCUMENTS

| | | |
|---|---|---|
| DE | 93 21 478 U | 8/1998 |
| EP | 0 414 628 A | 2/1991 |

(Continued)

OTHER PUBLICATIONS

International Search Report for corresponding International Application No. PCT/US2008/086375.

(Continued)

*Primary Examiner* — Rafferty Kelly
(74) *Attorney, Agent, or Firm* — Alston & Bird LLP

(57) ABSTRACT

A near-field antenna based on a coplanar waveguide is provided. The antenna is configured to communicate with a targeted transponder from among a group of multiple adjacent transponders. The antenna may include a first ground plane, a second ground plane, a dielectric substrate, and a conductive strip. The first ground plane and the second ground plane extend along the dielectric substrate and the conductive strip extends between the first ground plane and the second ground plane such that first ground plane and the conductive strip define a first slot extending between the first ground plane and the conductive strip and the second ground plane define a second slot extending between the second conductive strip and the conductive strip. The first ground plane, the second ground plane, and the conductive strip are substantially coplanar. In other embodiments, a novel assembly of a ribbon guide and a near-field antenna is provided.

28 Claims, 19 Drawing Sheets

(56) References Cited

U.S. PATENT DOCUMENTS

| | | | |
|---|---|---|---|
| 5,373,266 | A | 12/1994 | Lenzing et al. |
| 5,521,601 | A | 5/1996 | Kandlur |
| 5,587,578 | A | 12/1996 | Serra |
| 5,608,417 | A | 3/1997 | De Vall |
| 5,652,711 | A | 7/1997 | Vennekens |
| 5,777,586 | A | 7/1998 | Luxon et al. |
| 5,838,253 | A | 11/1998 | Wurz et al. |
| 5,983,243 | A | 11/1999 | Heiney et al. |
| 6,012,083 | A | 1/2000 | Savitzky et al. |
| 6,067,475 | A | 5/2000 | Graves et al. |
| 6,104,291 | A | 8/2000 | Beauvillier et al. |
| 6,118,379 | A | 9/2000 | Kodukula et al. |
| 6,154,137 | A | 11/2000 | Goff et al. |
| 6,177,872 | B1 | 1/2001 | Kodukula et al. |
| 6,181,287 | B1 | 1/2001 | Beigel |
| 6,215,402 | B1 | 4/2001 | Rao Kodukula et al. |
| 6,246,326 | B1 | 6/2001 | Wiklof et al. |
| 6,267,521 | B1 | 7/2001 | Lodwig et al. |
| 6,327,972 | B2 | 12/2001 | Heredia et al. |
| 6,346,881 | B1 | 2/2002 | Davidson |
| 6,392,544 | B1 | 5/2002 | Collins et al. |
| 6,409,401 | B1 | 6/2002 | Petteruti et al. |
| 6,421,018 | B1 | 7/2002 | Zeilinger et al. |
| 6,424,262 | B2 | 7/2002 | Garber et al. |
| 6,466,131 | B1 | 10/2002 | Tuttle et al. |
| 6,470,082 | B1 | 10/2002 | Nunokawa et al. |
| 6,473,028 | B1 | 10/2002 | Luc |
| 6,486,769 | B1 | 11/2002 | McLean |
| 6,527,356 | B1 | 3/2003 | Spurr et al. |
| 6,593,853 | B1 | 7/2003 | Barrett et al. |
| 6,624,718 | B2 | 9/2003 | Mauritz et al. |
| 6,802,659 | B2 | 10/2004 | Cremon et al. |
| 6,848,616 | B2 | 2/2005 | Tsirline et al. |
| 6,857,714 | B2 | 2/2005 | Hohberger et al. |
| 6,899,476 | B1 | 5/2005 | Barrus et al. |
| 6,929,412 | B1 | 8/2005 | Barrus et al. |
| 6,938,976 | B2 | 9/2005 | Siwinski et al. |
| 6,969,134 | B2 | 11/2005 | Hohberger et al. |
| 6,985,754 | B1 | 1/2006 | Pedersen et al. |
| 7,023,391 | B2 | 4/2006 | Wuidart et al. |
| 7,037,009 | B2 | 5/2006 | Barrus et al. |
| 7,142,815 | B2 | 11/2006 | Desjeux et al. |
| 7,190,270 | B2 | 3/2007 | Brown et al. |
| 7,342,499 | B2 | 3/2008 | Chiu et al. |
| 7,375,633 | B2 | 5/2008 | Shanton |
| 7,398,054 | B2 | 7/2008 | Tsirline et al. |
| 7,425,887 | B2 | 9/2008 | Tsirline et al. |
| 7,586,410 | B2 | 9/2009 | Tsirline et al. |
| 2001/0029857 | A1 | 10/2001 | Heredia et al. |
| 2002/0003498 | A1 | 1/2002 | Wuidart et al. |
| 2002/0109637 | A1* | 8/2002 | Kitagawa ............... 343/742 |
| 2002/0167397 | A1 | 11/2002 | Eroglu et al. |
| 2003/0063001 | A1 | 4/2003 | Hohberger et al. |
| 2003/0067504 | A1 | 4/2003 | Spurr et al. |
| 2003/0173408 | A1 | 9/2003 | Mosher, Jr. et al. |
| 2003/0224805 | A1 | 12/2003 | Suenaga |
| 2004/0095242 | A1 | 5/2004 | Grose et al. |
| 2004/0178267 | A1 | 9/2004 | Tsirline et al. |
| 2004/0195319 | A1 | 10/2004 | Forster |
| 2004/0203605 | A1 | 10/2004 | Safa |
| 2005/0032267 | A1 | 2/2005 | Liu et al. |
| 2005/0045723 | A1 | 3/2005 | Tsirline et al. |
| 2005/0045724 | A1 | 3/2005 | Tsirline et al. |
| 2005/0206524 | A1 | 9/2005 | Forster et al. |
| 2005/0274799 | A1* | 12/2005 | Torchalski et al. ........... 235/432 |
| 2006/0037502 | A1 | 2/2006 | Warther |
| 2006/0132312 | A1 | 6/2006 | Tavormina |
| 2007/0063843 | A1 | 3/2007 | Tsirline et al. |
| 2007/0080867 | A1 | 4/2007 | Son et al. |
| 2007/0099566 | A1 | 5/2007 | Borisov et al. |
| 2007/0176781 | A1 | 8/2007 | Brown et al. |
| 2007/0216591 | A1 | 9/2007 | Tsirline et al. |
| 2007/0252702 | A1* | 11/2007 | Wulff et al. ............. 340/572.8 |
| 2007/0262873 | A1 | 11/2007 | Tsirline et al. |
| 2008/0238606 | A1 | 10/2008 | Tsirline et al. |

FOREIGN PATENT DOCUMENTS

| | | |
|---|---|---|
| EP | 0 568 066 A1 | 11/1993 |
| EP | 0 568 067 A1 | 11/1993 |
| EP | 0 704 815 A2 | 4/1996 |
| EP | 1 224 607 A | 7/2002 |
| EP | 1 233 367 A | 8/2002 |
| EP | 1 394 719 A1 | 3/2004 |
| EP | 1 820 659 | 8/2007 |
| FR | 2 822 594 | 9/2002 |
| GB | 2 321 551 A | 7/1998 |
| JP | 7235826 | 9/1995 |
| JP | 2003132330 | 5/2003 |
| KR | 100714804 | 4/2007 |
| KR | 20070116658 | 12/2007 |
| WO | WO 01/35320 A1 | 5/2001 |
| WO | WO 2005/022445 A2 | 3/2005 |

OTHER PUBLICATIONS

Ron Schmitt; *Understanding electromagnetic fields and antenna radiation takes (almost) no math*; EDN; Mar. 2, 2000; pp. 77-88; available at <http://www.ednmag.com>.

David M. Pozar; *Paragraph 2.5—The Quarter-Wave Transformer*; Microwave Engineering; 2005; pp. 73-76; Third Edition; John Wiley & Sons, Inc.

Constantine A. Balanis; *Chapter 2—Fundamental Parameters of Antennas: Paragraph 2.2.4—Field Regions*; Antenna Theory: Analysis and Design; 2005; pp. 34-36; Third Edition; John Wiley & Sons, Inc.

Xianming Qing and Ning Yang; *2.45 GHZ Circularly Polarized RFID Reader Antenna*; IEEE; 2004; pp. 612-615 (XP10743394).

Boris Y. Tsirline; *UHF RFID Antennas for Printer-Encoders—Part I: System Requirements*; High Frequency Electronics; Sep. 2007; pp. 28-39 (8 pgs.); Summit Technical Media, LLC.

Boris Y. Tsirline; *UHF RFID Antennas for Printer-Encoders—Part 2: Antenna Types*; High Frequency Electronics; Oct. 2007; pp. 36-45 (8 pgs.); Summit Technical Media, LLC.

Boris Y. Tsirline; *UHF RFID Antennas for Printer-Encoders—Part 3: Mobile Equipment*; High Frequency Electronics; Nov. 2007; pp. 18-25 (5 pgs.); Summit Technical Media, LLC.

Office Action issued May 16, 2008, in U.S. Appl. No. 11/371,785.
Office Action issued Dec. 3, 2008, in U.S. Appl. No. 11/371,785.
Notice of Allowance issued May 6, 2009, in U.S. Appl. No. 11/371,785.
Office Action mailed Mar. 25, 2008, in U.S. Appl. No. 11/121,208.
Office Action mailed Aug. 5, 2008, in U.S. Appl. No. 11/121,208.
Office Action mailed Aug. 18, 2009, in U.S. Appl. No. 11/121,208.
Office Action mailed Mar. 18, 2010, in U.S. Appl. No. 11/121,208.
Office Action mailed Oct. 26, 2010, in U.S. Appl. No. 11/121,208.

K.C. Gupta, Ramesh Garg, Inder Bahl, Prakash Bhartia, Microstrip Lines and Slotlines, Second Edition, 1996, Artech House, Inc.

McMillan, et al., Leaky Fields on Microstrip, Progress in Electromagnetics Research, Pier 17, pp. 323-377, 1997 USA.

Maloratsky, Reviewing the Basics of Microstrip Lines, Microwaves & RF, pp. 79-88, Mar. 2000, USA.

Maloratsky, Couplers Shrink HF/VHF/UHF Designs, Microwaves & RF, pp. 93-96, Jun. 2000, USA.

Maloratsky, Design Regular-and Irregular-Print Coupled Lines, Microwaves & RF, pp.97-106, Sep. 2000 USA.

Maloratsky, The Basics of Print Reciprocal Dividers/Combiners, Microwave Journal, Sep. 2000, USA; 15 pages.

Maloratsky, Understand the Basics of Microstrip Directional Couplers, Microwaves & RF, pp. 79-94, Feb. 2001, USA.

Maloratsky, Improve BPF Performance With Wiggly Coupled Lines, Microwaves & RF, pp. 53-62, Apr. 2002, USA.

Maloratsky, Reviewing the Basics of Suspended Striplines, Microwave Journal, Oct. 2002, USA; 5 pages.

International Search Report and Written Opinion for International Application PCT/US2004/027832, mailed May 6, 2005.

International Search Report and Written Opinion for International Appl. No. PCT/US2007/063680, mailed Jul. 26, 2007.

* cited by examiner

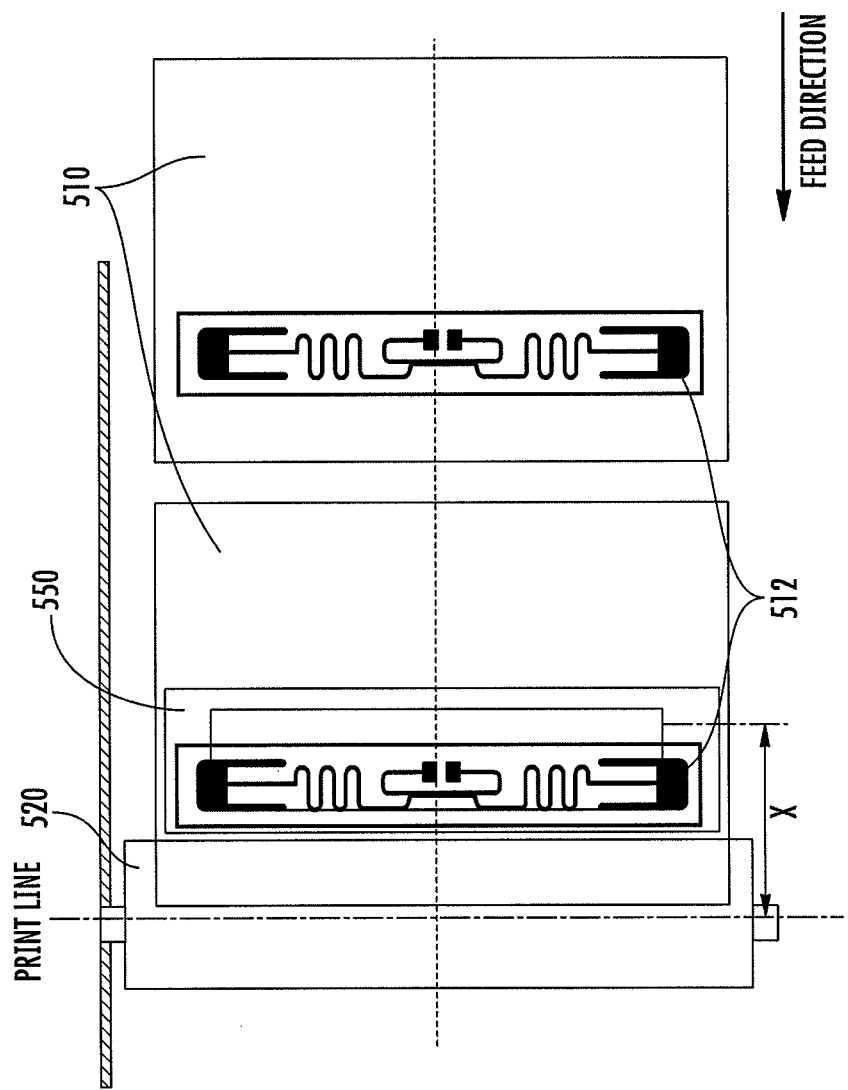

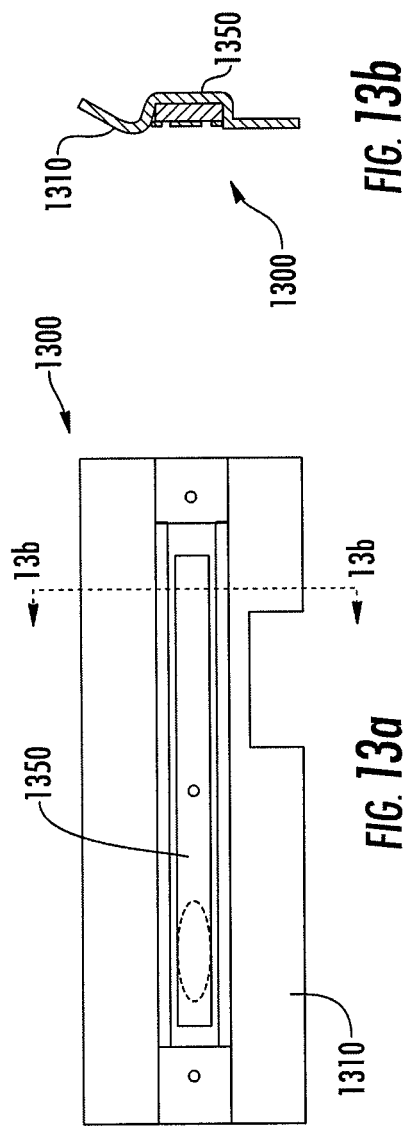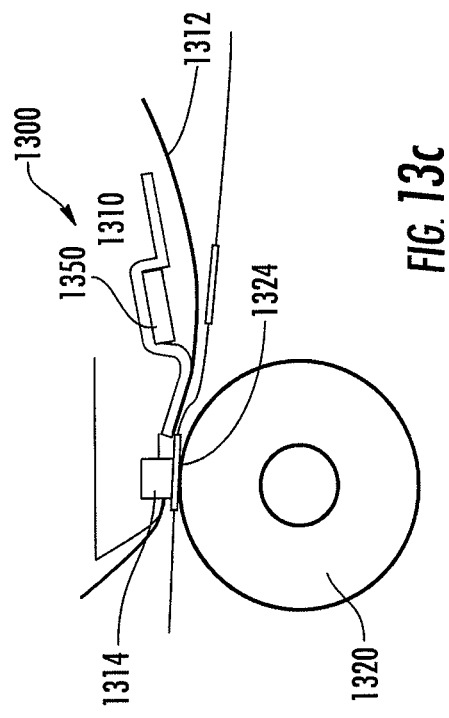

RFID NEAR-FIELD ANTENNA AND ASSOCIATED SYSTEMS

BACKGROUND OF THE INVENTION

1. Field of the Invention

The present invention relates to near-field antenna and, in particularly, to spatially selective antennas capable of selectively communicating with a targeted transponder from among a group of adjacent transponders.

2. Description of Related Art

Radio frequency identification ("RFID") transponders, either active (e.g., battery-powered, -assisted, or -supported) or passive, are typically used with an RFID reader or similar device for communicating information back and forth. In order to communicate, the reader exposes the transponder to a radio frequency (RF) electromagnetic field or signal. In the case of a passive transponder, the RF electromagnetic field energizes the transponder and thereby enables the transponder to respond to the reader by re-radiating the received signal back and modulating the field in a well-known technique called backscattering. In the case of an active transponder, the transponder may respond to the electromagnetic field by transmitting an independently powered reply signal to the reader.

Problems can occur when interrogating multiple adjacent transponders regardless on whether the transponders are passively or actively powered. For example, an interrogating electromagnetic signal may activate more than one transponder at a given time. This simultaneous activation of multiple transponders may lead to collision or communication errors because each of the multiple transponders may transmit reply signals to the reader at the same time.

Several collision management techniques commercially exist for allowing near simultaneous communication between multiple transponders and a single reader while reducing communication errors. However, such collision management techniques tend to increase system complexity, cost, and interrogation time. Furthermore, such techniques are often "blind" in that it cannot determine what transponder or transponders are responding out of a plurality of transponders near the antenna of the reader. For example, in a printer-encoder device, the device would not know whether the reader was communicating with a transponder embedded in a label closest to the printhead or not.

Another method of preventing multiple transponder activation is to isolate transponders from one another. For example, devices or systems may employ an RF-shielded housing or anechoic chamber for shielding the adjacent and non-targeted transponders from the electromagnetic field. In various applications, transponders individually pass though a shielded housing for individualized exposure to an interrogating RF electromagnetic field. Unfortunately, RF-shielded housings add cost and complexity to a system and limit the type (i.e., form-factor) of transponders that can be processed by the system. Furthermore, many systems are limited with regard to space or weight and, thus, cannot accommodate such shielded housings.

The challenge of avoiding multiple transponder activation may be especially acute in some applications. RFID printer-encoders are one example. RFID printer-encoders are devices capable of encoding and printing a series or stream of labels with embedded transponders. The close proximity of the transponders to each other, during processing, makes targeting a particular transponder for encoding purposes problematic. Moreover, the space, cost, and weight restrictions associated with such devices, among other factors, make collision management techniques or shielding components for alleviating multiple transponder activation less than desirable.

Another example of an application in which multiple transponder activation may be acute is a conveyor system.

BRIEF SUMMARY

According to an embodiment, a RFID system for selectively communicating with a targeted transponder from among a group of multiple adjacent transponders is provided. The RFID system includes a transponder conveyance system and an antenna. The transponder conveyance system may be configured to transport at least one targeted transponder from a group of multiple adjacent transponders through a transponder encoding area along a feeding path. The antenna may include at least a first ground plane, a second ground plane, a dielectric substrate, and a conductive strip. The first ground plane and the second ground plane extend along the dielectric substrate and the conductive strip extends between the first ground plane and the second ground plane such that first ground plane and the conductive strip define a first slot extending between the first ground plane and the conductive strip and the second ground plane define a second slot extending between the second conductive strip and the conductive strip. The first ground plane, the second ground plane, and the conductive strip are substantially coplanar. The antenna may be configured to transmit an electromagnetic wave to the transponder encoding area for communicating with the targeted transponder. The antenna may be further configured to operate within a band of frequencies and the conductive strip defines an electrical length substantially equal to a multiple of one-half of a wavelength of a center frequency of the band of frequencies.

The RFID system may further include a reader configured to provide bi-direction communication with the targeted transponder through the antenna.

The antenna may further include a terminating load and an RF port. The conductive strip that extends from a signal end of the conductive strip connected to the reader through the RF port to a loaded end of the conductive strip connected to the terminating load.

The first slot defines a first width profile and the second slot defines a second width profile. The first width profile and the second width profile may be symmetrical along the length of the conductive strip. Each of the first width and the second width may vary along at least a portion of the conductive strip.

The antenna may also include a third ground plane opposite the dielectric substrate from the first and second ground planes and the conductive strip.

The antenna may also include a phase inverter configured to generate two signals, each 180 degrees out of phase with each other, to the conductive strip and the first and second ground planes such that a voltage applied between the conductive strip and the first ground plane has an inverse phase in regards to a voltage applied between a conductive strip and the second ground plane.

In another embodiment, a printer-encoder for printing and encoding a series of media units is provided. At least one media unit includes at least one transponder. The printer-encoder may include a printhead, a conveyance system, a reader, and antenna. The printer may be configured to print indicia onto the media units. The conveyance system may be configured to transport a series of media units including the at least one transponder to the printhead and a transponder encoding area along a feed path in a feed direction. The reader may be configured to process one or more communication signals. The antenna may be configured to direct the communication signals to and from the reader and communicate with the at least one transponder in the transponder encoding area.

The antenna may include at least a first ground plane, a second ground plane, a dielectric substrate, and a conductive strip. The first ground plane and the second ground plane extend along the dielectric substrate. The conductive strip extends between the first ground plane and the second ground plane such that first ground plane and the conductive strip define a first slot extending between the first ground plane and the conductive strip and the second ground plane define a second slot extending between the second conductive strip and the conductive strip. The first ground plane, the second ground plane, and the conductive strip are substantially coplanar.

The printer-encoder may further include a platen roller and a ribbon guide. The ribbon guide may be configured to direct a portion of a thermal ribbon between the printhead and the platen roller. The printhead may be configured to provide heat and press against the portion of the thermal ribbon again the platen roller such that indicia is formed on a media unit between the platen roller and the printhead. The ribbon guide may define a recessed portion configured to receive the antenna.

In yet another embodiment, a method is provided. The method may include providing an antenna that includes at least a first ground plane, a second ground plane, a dielectric substrate, and a conductive strip, wherein the first ground plane and the second ground plane extend along the dielectric substrate and the conductive strip extends between the first ground plane and the second ground plane such that first ground plane and the conductive strip define a first slot extending between the first ground plane and the conductive strip and the second ground plane define a second slot extending between the second conductive strip and the conductive strip and wherein the first ground plane, the second ground plane, and the conductive strip are substantially coplanar; transporting a targeted transponder out of the plurality of transponders along the feed path into the transponder encoding area; and sending one or more electrical signals to the antenna such that the conductive strip and the first and second slots emit an electromagnetic wave the transponder encoding area for communicating with the targeted transponder in the transponder encoding area.

The method may further include printing indicia onto a media unit, wherein the targeted transponder is attached to the media unit and/or providing a reader connected with the antenna and configured to generate and receive the one or more electrical signals or both.

The operation of transporting the targeted transponder into the transponder encoding area may further include aligning a center of the transponder with an end of the conductive strip of the antenna.

The method may also include providing a first signal and a second signal 180 degrees out of phase with the first signal to the conductive strip and the first and second ground planes such that a voltage applied between the conductive strip and the first ground plane has an inverse phase in regards to a voltage applied between a conductive strip and the second ground plane.

BRIEF DESCRIPTION OF THE SEVERAL VIEWS OF THE DRAWING(S)

Reference will now be made to the accompanying drawings, which are not necessarily drawn to scale, and wherein:

FIG. 5 is a simplified top view of a co-centered dipole-type transponder and a microstrip near-field antenna in a center-justified system;

FIG. 13a is a bottom view of a ribbon guide and a near-field antenna assembly according to an exemplary embodiment;

FIG. 13b is a side view of the ribbon guide and the near-field antenna assembly of FIG. 13a taken along line 13b-13b;

FIG. 13c is a side view of the assembly of FIG. 13a, a platen roller, and a stream of media units;

DETAILED DESCRIPTION OF THE INVENTION

The present invention now will be described more fully hereinafter with reference to the accompanying drawings, in which some, but not all embodiments of the invention is shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Embodiments of the present invention concern an apparatus for enabling an RFID reader to selectively communicate with a targeted transponder that is commingled among or positioned in proximity to multiple adjacent transponders. As will be apparent to one of ordinary skill in the art, various embodiments of the present invention are described below that selectively communicate with a targeted transponder requiring little to no electromagnetic isolation of the transponder through the use space-consuming shielded housings, anechoic chambers, or relatively more complex or costly collision management techniques.

Several embodiments of the present invention may be useful for reading, writing, or otherwise encoding passive or active transponders attached to items located on assembly lines, in inventory management centers where on-demand RFID labeling may be needed, or in other similar circumstances, where the transponders are in close proximity to each other. In various embodiments, one or more transponders are mounted to or embedded within a label, ticket, card, or other media form that may be carried on a liner or carrier. In alternate linerless embodiments, a liner or carrier may not be needed. Such RFID enabled labels, tickets, tags, and other media forms are referred to collectively herein as "media units" or as "smart media units." As will be apparent to one of ordinary skill in the art, it may be desirable to print indicia such as text, numbers, barcodes, graphics, etc., to such media units before, after, or during communications with their corresponding transponders.

An example of an RFID system that may benefit from one or more of the embodiments of the present invention is a RFID enabled printer system, also referred to herein as "printer-encoder" or a RFID print-engine applicators. Examples of printer-encoders are disclosed in commonly-owned U.S. Pat. Nos. 6,481,907 and 6,848,616, which are hereby incorporated herein by reference.

Figure 1:
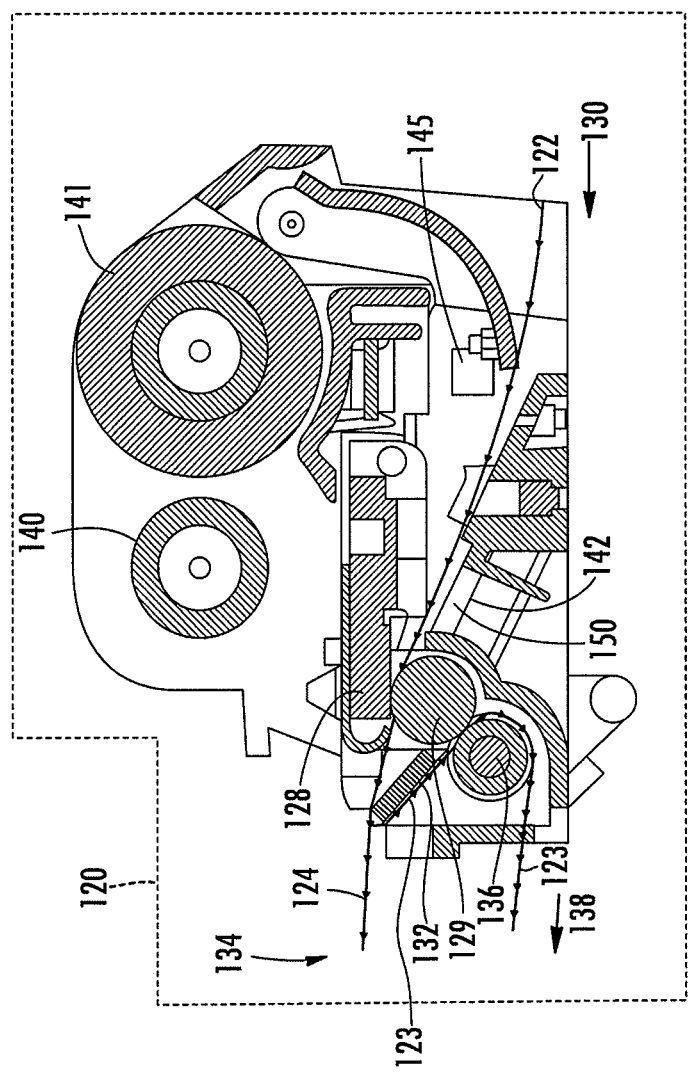
FIG. 1 is a side schematic view of a printer-encoder according to an embodiment of the present invention.

FIG. 1 illustrates an example of a RFID printer-encoder 120 structured for printing and encoding a series or stream of media units 124. The printer-encoder 120 includes several components, such as a printhead 128, a platen roller 129, a feed path 130, a peeler bar 132, a media exit path 134, rollers 136, a carrier exit path 138, a ribbon take-up spool 140, a ribbon supply roll 141, a reader 142, a controller 145, and a coplanar waveguide near-field antenna 150.

As noted above, media units may include labels, cards, etc, that are carried by a substrate liner or web 122. The web 122 is directed along the feed path 130 and between the printhead 128 and the platen roller 129 for printing indicia onto the media units 124. The ribbon supply roll 141 provides a thermal ribbon (not shown for clarity) that extends along a path such that a portion of the ribbon is positioned between the printhead 128 and the media units 124. The printhead 128 heats up and presses a portion of the ribbon onto the media units 124 to print indicia. The take-up spool 140 is configured to receive and spool the used ribbon. This printing technique is commonly referred to as a thermal transfer printing. However, several other printing techniques may be used including, but not limited to, direct thermal printing, inkjet printing, dot matrix printing, and electro-photographic printing.

After printing, the media unit web 122 proceeds to the media exit path 134 where the media units are typically individually removed from the web 122. For example, in one embodiment, pre-cut media units 124 may be simply peeled from the web 122 using the peeler bar 132 as shown. In other embodiments, a group of multiple media units may be peeled together and transmitted downstream to an in-line cutter for subsequent separation (not shown). Various other known media unit removal techniques may be used as will be apparent to one of ordinary skill in the art.

In applications, such as the depicted embodiment, in which the media units 124 are supported by a web 122, the web 122 may be guided along a path toward the carrier exit path 138 by rollers 136 or other devices once being separated from the media units. Techniques and structures for conveying or guiding the web of media units along the entire feed path of the printer-encoder are generally referred to as conveyance systems.

The reader 142 is configured for generating and transmitting RF communication signals that are broadcasted by the coplanar waveguide near-field antenna 150 located proximate the media feed path 1130. For purposes of the present specification, the reader 142 and the coplanar waveguide near-field antenna 150 may be referred to collectively as forming at least part of a communication system. As will be explained in more detail below, the communication system transmits an electromagnetic wave for establishing, at predetermined reader power levels, a mutual coupling between the reader and a targeted transponder of a media unit that is located in the transponder encoding area, such that data may be read from and written to transponder. The electromagnetic wave has a near-field strength and a far-field strength. The strength in the near-field differs from the strength of the far-field. In general, the far-field is too weak to activate or communicate with any of the transponders, while the near-field is strong enough in the transponder encoding area such that it only activates the transponders in the transponder encoding area. In general, the reader is a device configured to generate, process, and receive electrical communication signals. One skilled in the art would appreciate that similar devices such as transmitters, receivers, or transmitter-receivers may be used within this invention. "Reader" as used in the present application and the appended claims refers to the devices noted above and to any device capable of generating, processing, or receiving electrical and/or electromagnetic signals. For example, a reader may be a combination of a receiver and a transmitter.

In some applications, such as portable and compact systems, the near-field antenna may be near or approximate with the printhead. For example, the near-filed antenna may be close enough to the printhead that at least a part of the communication area overlaps the printhead, which may allow the system to encode the shortest possible labels or maintain the shortest pitch between labels. In other words, the system may be configured such that the system is printing indicia onto the media unit while it is interrogating or encoding the transponder of the media unit. The close proximity of the near-field antenna and printhead may be necessary or desirable in order to maintain overall compact design of the system. It may also create a situation in which the interrogation or encoding of a transponder occurs in essentially the same space as any printing operations.

Figure 2A:
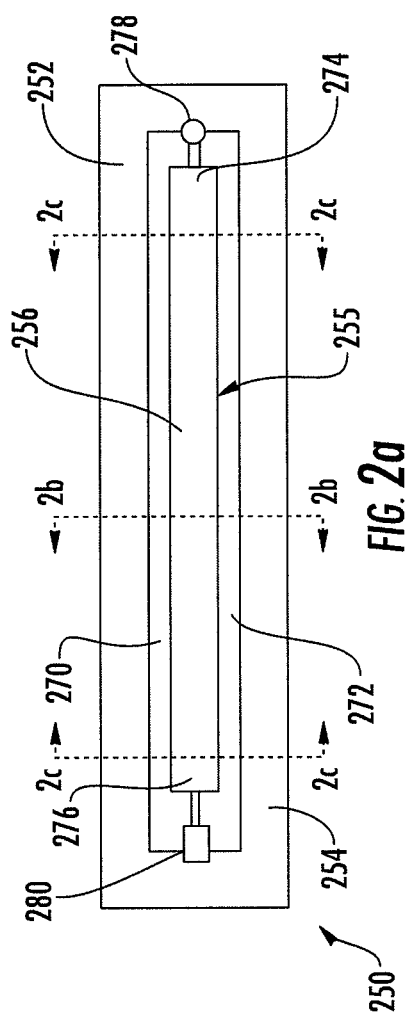
FIG. 2a is a top view of a near-field antenna based on a coplanar waveguide consistent with an exemplary embodiment.
Figure 2B:
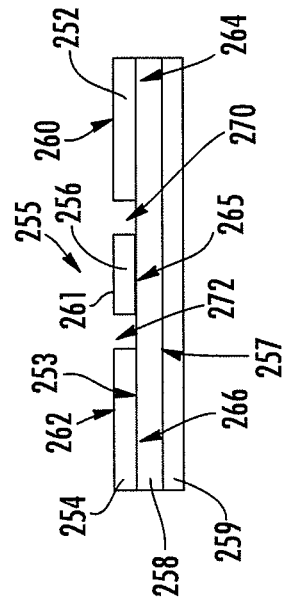
FIG. 2b is an end view of the near-field antenna of FIG. 2a taken along line 2b-2b.
Figure 2C:
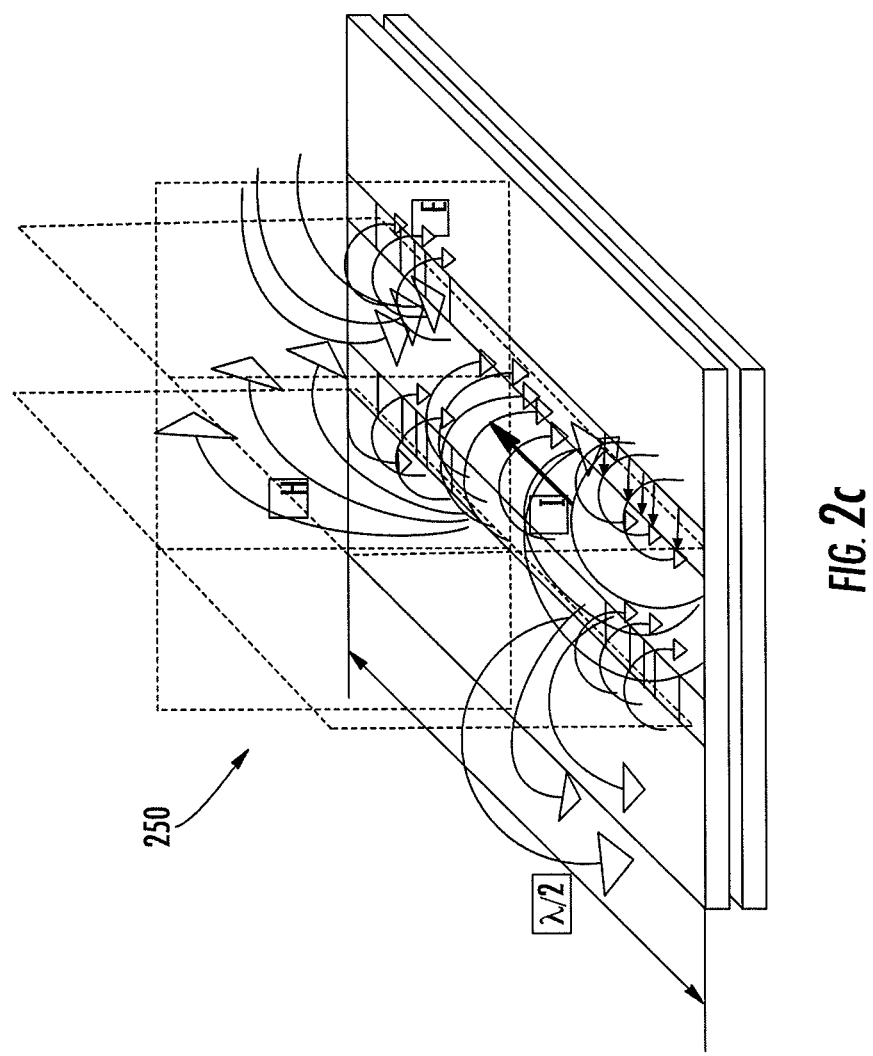
FIG. 2c is a perspective view of an electromagnetic field distribution of the near-field antenna of FIG. 2a taken between the two lines 2c-2c.
Figure 3A:
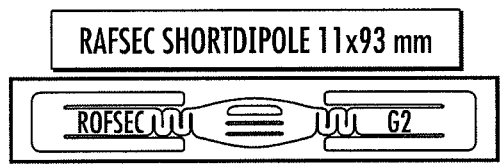
FIG. 3a illustrates an example of a large dipole-type transponder.
Figure 3B:
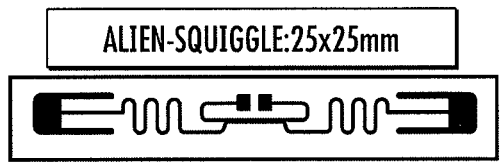
FIG. 3b illustrates another example of a large dipole-type transponder.
Figure 3C:
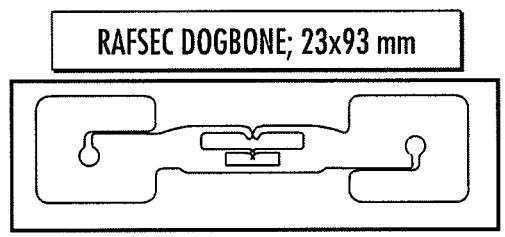
FIG. 3c illustrates another example of a large dipole-type transponder.
Figure 3D:
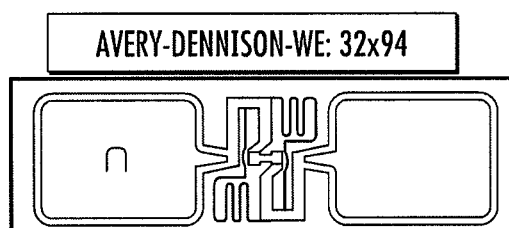
FIG. 3d illustrates another example of a large dipole-type transponder.
Figure 3E:
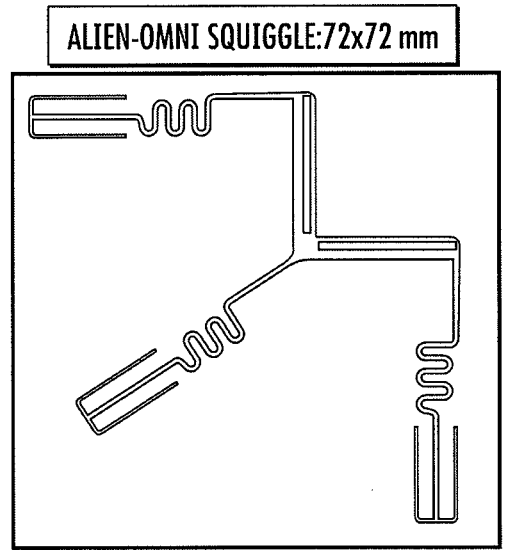
FIG. 3e illustrates an example of a large two port IC dipole-type transponder.
Figure 3F:
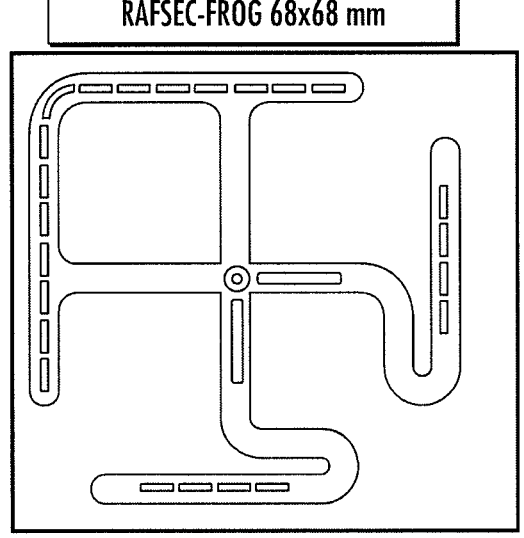
FIG. 3f illustrates another example of a large two port IC dipole-type transponder.
Figure 4A:
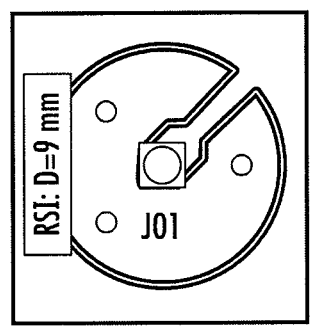
FIG. 4a illustrates an example of a small loop-type transponder.
Figure 4B:
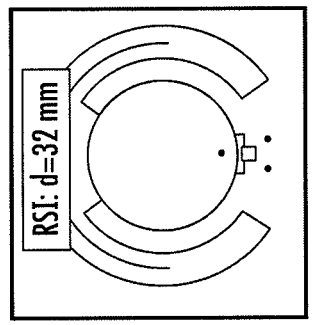
FIG. 4b illustrates another example of a small loop-type transponder.
Figure 4C:
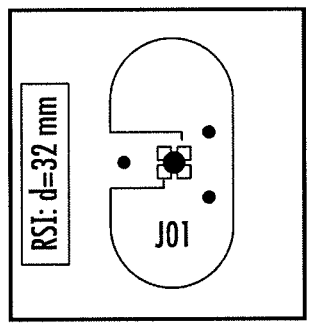
FIG. 4c illustrates another example of a small loop-type transponder.
Figure 4D:
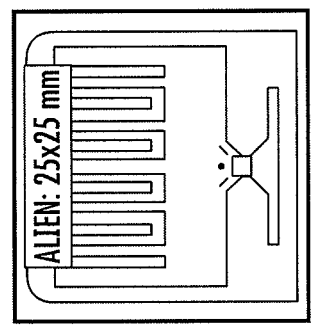
FIG. 4d illustrates another example of a small loop-type transponder.
Figure 4E:
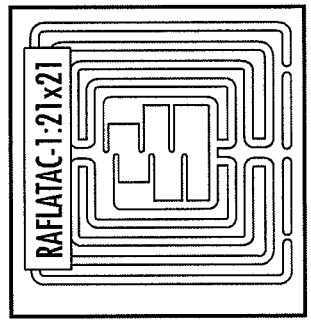
FIG. 4e illustrates another example of a small loop-type transponder.
Figure 4F:
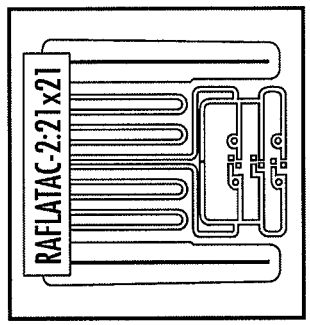
FIG. 4f illustrates yet another example of a small loop-type transponder.

FIGS. 2a, 2b, and 2c illustrate a coplanar waveguide near-field antenna 250 in accordance with an exemplary embodiment. The coplanar waveguide near-field antenna 250 is structured in electrical communication with the reader (not shown in FIGS. 2a, 2b, and 2c) for receiving and broadcasting the signals originating from the reader to the targeted transponder. In the depicted embodiment, the coplanar waveguide antenna 250 includes a first ground plane 252, a second ground plane 254, a conductive strip 256, a dielectric substrate 258, an RF port 278 and a terminating load 280. As illustrated, the antenna 250 may have a third ground plane 259 that extends along a second opposite surface of the dielectric substrate 258.

As best seen in FIG. 2b, each of the first ground plane 252, the second ground plane 254, the conductive strip 256, and the dielectric substrate 258 define a first surface 260, 261, 262, 263 and an opposite second surface 264, 265, 266, 267. The first surface and second surface defines a thickness of the element 252, 254, 258. Each of the first ground plane 252, the second ground plane 254, and the conductive strip 256 has a first edge and a second edge defining a width of the element.

The first and second ground planes 252, 254 extend along the dielectric substrate 258. For example, in the illustrated embodiment, the second surfaces 260, 261 of the first and second ground planes extend along the first surface 262 of the dielectric substrate. The first and second ground planes 252, 254 may have substantially the same thickness. Therefore, as illustrated, the first surfaces 260, 262 of the first and second ground planes may be substantially coplanar relative to each other.

The first and second ground planes 252, 254 may be spaced apart from each other. Specifically, the adjacent edges of the first and second ground planes 252, 254 may be spaced apart to form an opening 255 of the antenna. The opening 255 extends between the two facing edges of the first and second ground planes 252, 254. The width of the opening 255 is the distance between the two facing edges of the first and second ground planes 252, 254 and the length of the opening 255 is the length of the first and second ground planes 252, 254. The thickness of the opening 255 is the distance from the first surface 263 of the dielectric substrate to the first surfaces 260, 262 of the first and second ground planes.

The conductive strip 256 extends along the dielectric substrate within the opening. The conductive strip 256 and the first and second ground planes 252, 254 form a first and a second slot 270, 272 of the antenna. The first slot 270 extends between an edge of the first ground plane 252 and the conductive strip 256 and the second slot 272 extends between an edge of the second ground plane 254 and the conductive strip 256. As illustrated in FIGS. 2a, 2b, and 2c, the adjacent and facing edges of the first and second ground planes 252, 254 may be substantially parallel to each other and the conductive strip 256 may be substantially co-centric relative to the opening such that the first and second slots 270, 272 have equal widths along the length of the conductive strip 256. The conductive strip 256 may have a thickness substantially equal to the thickness of either the first ground plane 252 or the second ground plane 254 such that the first surface 261 of the conductive strip, the first surface 260 of the first ground plane, and the first surface 262 of the second ground plane are coplanar.

Although the dielectric substrate 258 and the first and second ground planes 252, 254 are illustrated as a separate layer of the antenna having a limited width that forms a compact rectangular shape, the general shape of the dielectric substrate and the ground planes may vary between applications. For example, the ground planes and the dielectric substrate may be a portion of a relatively larger printed circuit board. The dielectric substrate may be made or constructed from various dielectric materials, including but not limited to, plastics, glasses, ceramics, or combinations such as Rogers materials, Isola materials, or woven glass reinforced epoxy laminate, commonly referred to as "FR4" or flame resistant 4. One in the art would appreciate that these various materials may be used to achieve a specific dielectric constant. For example, it can be a composite material that includes ferrite combined with ceramic to increase permittivity and permeability of a substrate to achieve miniaturization of an antenna.

The method of fabricating the antenna, including the conductive strip may vary. The conductive strip may also be deposited directly onto the first surface of the dielectric. For example only, the conductive strip may be printed or etched onto the surface or buried inside a substrate.

As explained in more detail below, the conductive strip 256 provides a conductive plane for the propagation of electromagnetic waves from the antenna to a targeted transponder. The conductive strip 256 is fabricated from a conductive material. For example only, the conductive material may be copper, gold, silver, aluminum or combination thereof, or doped silicon or germanium. The conductive strip 256 has a length extending from a first end, referred to herein as the signal end 274, to a second end, referred to herein as the loaded end 276. The length of the conductive strip (i.e., the distance between the signal end 274 and the loaded end 276) may be approximately equal to one-half the wavelength of a center operating frequency of the near-field antenna or a multiple of one-half the wavelength of a center operating frequency (i.e., the length equals $N*\lambda/2$, where N is an integer). In embodiments in which the coplanar waveguide near-field antenna includes a third ground plane 259 that is located opposite the dielectric substrate 258 from the other two ground planes 252, 254, the physical length of the conductive strip 256 may be decreased while the electrical length remains equal to a multiple of one-half the wavelength.

The coplanar waveguide antenna 250 may further include an RF port 278 and a terminating load 280. The signal end 274 of the conductive strip is connected to the RF port 278. The loaded end 276 of the conductive strip is connected to the terminating load 280. The RF port 278 connects the reader directly (or indirectly through any form of transmission line) to the antenna. In particular, the reader is configured to send an electrical signal to the antenna 250 through the RF port 278. The signal passes through the RF port 278, the conductive strip 256, and into the terminating load 280, which is connected to at least one of the ground planes 252, 254, 259. The terminating load 280 may vary. As an example, the terminating load 280 may equal 50 ohms to simplify a system impedance match.

In general, as the electrical signal passes through the conductive strip, the conductive strip and one or more ground planes operate as a transmission line, rather than operating as a standing wave radiating antenna or magnetic field generating coil. The passing signal in the conductive strip generates electromagnetic fields concentrated in the near field region of the conductive strip. The electromagnetic fields may be adapted to couple the reader (through the antenna) to a transponder disposed proximate the conductive strip, referred to herein as the transponder encoding area.

Commonly owned U.S. Patent Application Publication Nos. 2007/0262873, 2007/0216591, 2007/216591, 2005/0045723 and 2005/0045724 to Tsirline et al., which are hereby incorporated by reference, disclose among other things, using a microstrip or stripline transmission line as a near-field antenna. Although near-field antennas based on a microstrip or a stripline transmission line may be adequate for the encoding of certain types of media units within certain types of printer-encoders, such near-field antennas have limitations.

More specifically, FIGS. 3a through 3f illustrate examples of a first common category of transponders referred to as large dipole-type due to the structure of the antennas of the transponders. FIGS. 4a through 4f illustrate examples of a second common category of transponders referred to as a small loop-type due to the structure of the antennas of the transponders. Terms such as "large" and "small" are intended to indicate the relative size of the transponders compared to an operational wavelength of the transponder. As examples, the large dipole-type may be about 3 inches wide (i.e., the largest dimension of the dipole-type) and the small loop-type may be about 1 inches wide.

Figure 6:
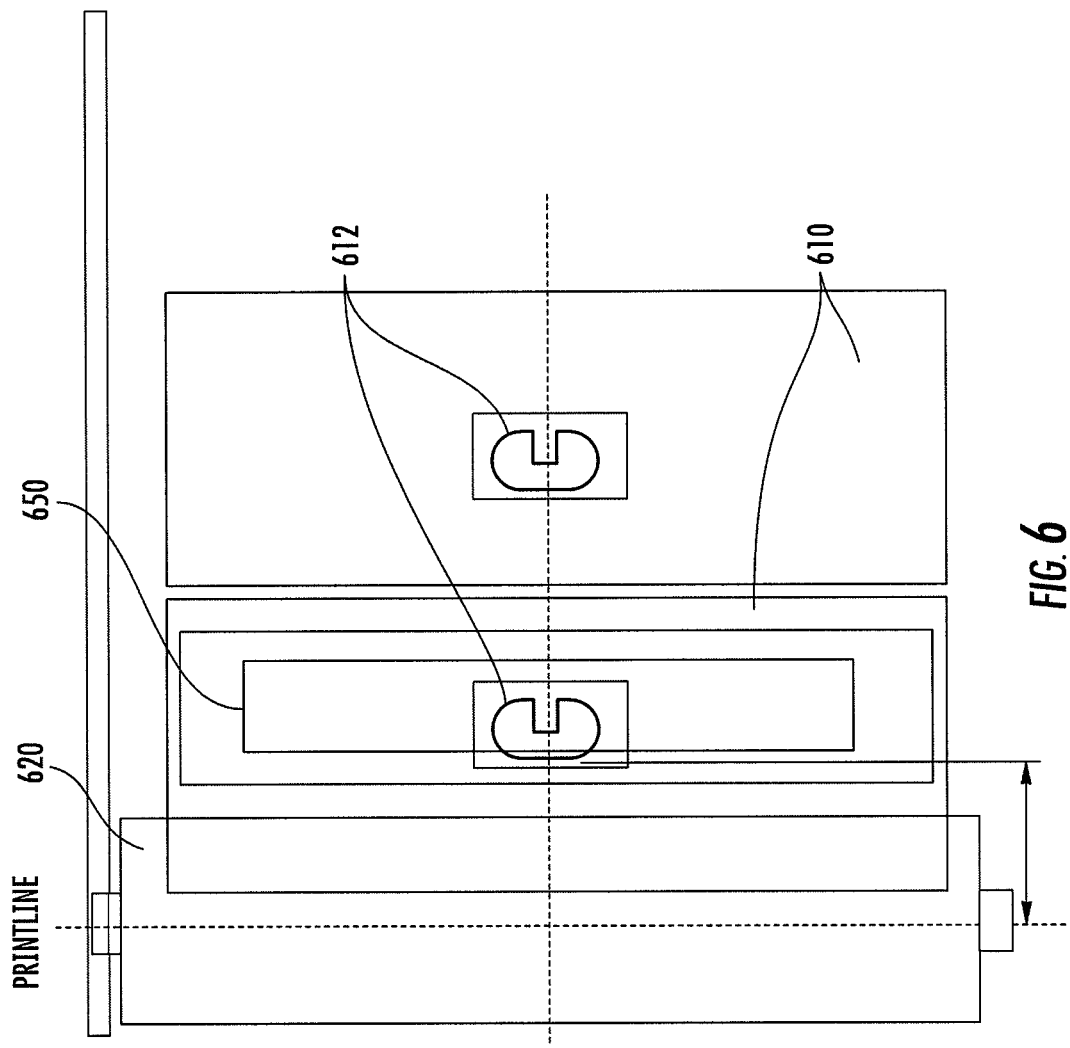
FIG. 6 is a simplified top view of a co-centered loop-type transponder and a microstrip near-field antenna in a center-justified system.
Figure 8:
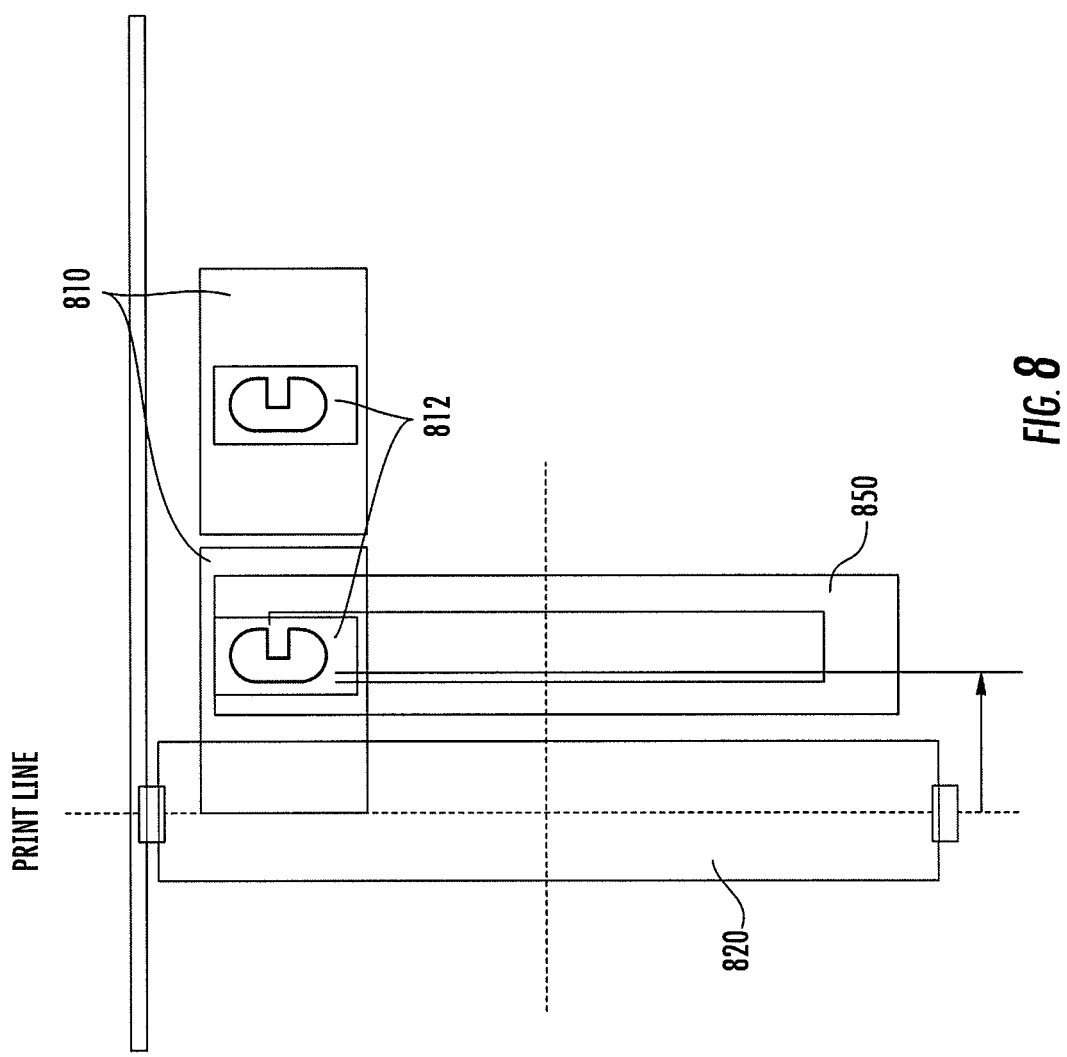
FIG. 8 is a simplified top view of a loop-type transponder and a microstrip near-field antenna in a printer-encoder having an edge-justified system.

In many systems, a near-field antenna based on a microstrip or stripline transmission line is generally placed cross-wise relative to the feeding path or feeding direction such that length of the conductive strip of the near-field antenna is orthogonal to the feeding path or feeding direction. The alignment of the media units within the printer-encoder may be referred to as either edge-justified (also referred to as side-justified) or center-justified. FIG. 8 illustrates an example of an edge-justified system. In an edge-justified system, the media unit 810 and, thus, the transponder 812 are positioned near or aligned with the edge 852 of the near-field antenna 850 regardless of the relative sizes of the media unit 810 and the near-field antenna 850. For example, in this example, the width of the media unit 810 is smaller than the length of the near-field antenna 850 and the center of the transponder 812 is aligned with an end of the conductive strip of the near-field antenna 850. FIGS. 5 and 6 illustrate examples of a center justified system. In a center justified system, the media unit 510, 610 and thus, the transponder 512, 612, is positioned proximate to the center of the conductive strip of the near-field antenna 550, 650 regardless of the relative sizes of the media unit 510, 610 and the near-field antenna 550, 650. For example, although the media unit 610 of FIG. 6 is narrower than the near-field antenna 650, the center of the transponder is aligned with the center of the conductive strip of the near-field antenna 650.

Figure 14A:
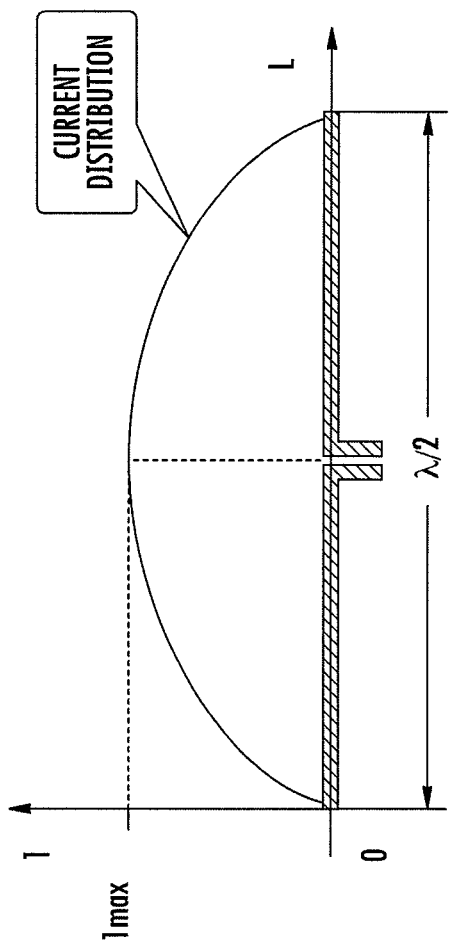
FIG. 14a is a graphical illustration of the current distribution along the length of a dipole-type antenna.
Figure 14B:
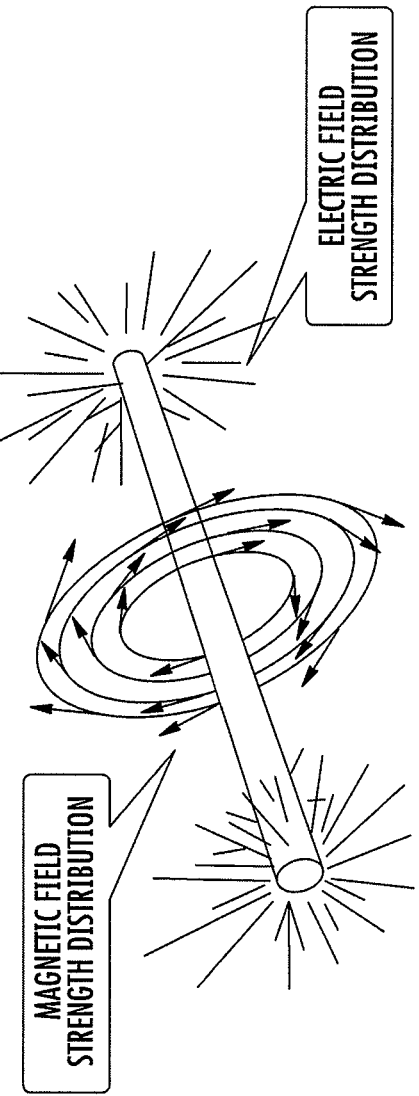
FIG. 14b is an illustration of the magnetic and electric field distribution of a dipole-type antenna.

In general, microstrip and stripline near-field antennas have a limited RF power efficiency because their electric field distribution is concentrated between the conductive strip and the ground planes and the field strength above the conductive strip is relatively weak. When the characteristic impedance of the microstrip or stripline is lower than a terminating load then the maximum strength of the magnetic field component emitting from the conductive strip of a stripline or microstrip near-field antenna is at the center of the conductive strip and the maximum strength of the electric field component emitting from the conductive strip of a stripline or microstrip near-field antenna is at the edges of the conductive strip as illustrated in FIGS. 14a and 14b. When the characteristic impedance is higher than the terminating load then the maximum strength of the magnetic field component is at the edges of the conductive strip and the maximum strength of the electrical field component is at the center of the conductive strip. The distribution of electric and magnetic field components for microstrip and stripline transmission lines is further discussed in detail in "UHF RFID Antennas for Printer-Encoders-Part 1: System Requirements", High Frequency Electronics, Vol. 6, No. 9, September 2007, pp. 28-39 which is authored by one of the inventors of the present application and is hereby incorporated by reference in its entirety.

Therefore, in a center-justified system processing large dipole-type transponders, the electric and magnetic field components from the stripline or microstrip near-field antenna may be optimally aligned with the center of the transponder to facilitate reliable communication between the transponder and the reader through the near-field antenna as illustrated in FIG. 5. In some instances, a large dipole-type transponder may be large enough relative to the near-field antenna that even in an edge-justified system the transponder is close enough to the center of the conductive strip not to make a significant difference in the microstrip or stripline near-field antenna's ability to communicate with the transponder in the edge-justified system compared to a center-justified system.

Figure 7:
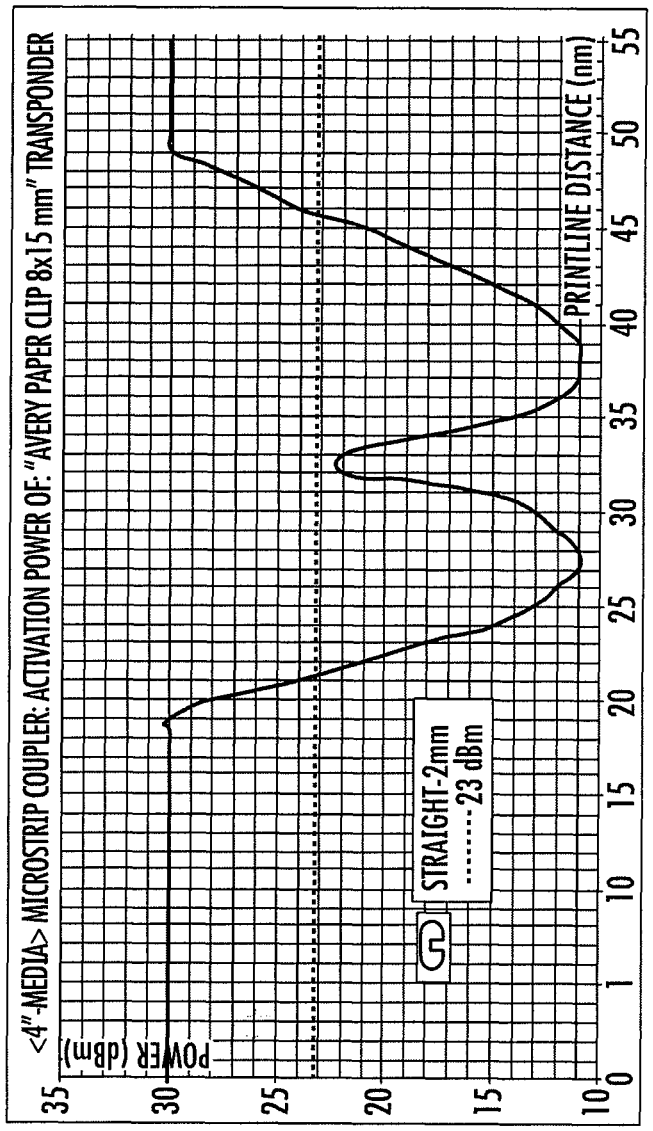
FIG. 7 is a graphical illustration of the level of RF power applied to the antenna for activating the loop-type transponder of FIG. 6 as a function of the distance between a leading edge of the transponder and a printline.

However, for small loop type transponders, a stripline or microstrip near-field antenna may by incapable of providing reliable communication with transponders at a desired or acceptable power level depending on whether the system is edge-justified or center-justified. For example, as illustrated in FIG. 6, in a center-justified system, although relatively small compared to the operating wavelength of the microstrip near-field antenna 650, the loop-type transponder 612 is generally aligned with the center of the microstrip near-field antenna 650, where the magnetic field strength is the greatest. Such an alignment allows for reliable communication at an acceptable power level. Specially, the center-justified system may include a platen roller 620 that defines a printline of the system (i.e., the point at which the printhead prints indicia onto the media unit) and the near-field antenna 650 may be position d adjacent to the platen roller 620. For example, the near-field antenna may be positioned directly in front of the platen roller such that the near-field antenna is inside the printer-encoder or behind the platen roller such that the near-field antenna is at least partially or complete outside the printer-encoder. As illustrated in FIG. 7, the microstrip near-field antenna may be able to activate the transponder from a distance approximately 45 mm to 34 mm and 32 mm to 20 mm from the printline at a power level (i.e., the power provided by the reader) below 23 dBm.

Figure 9:
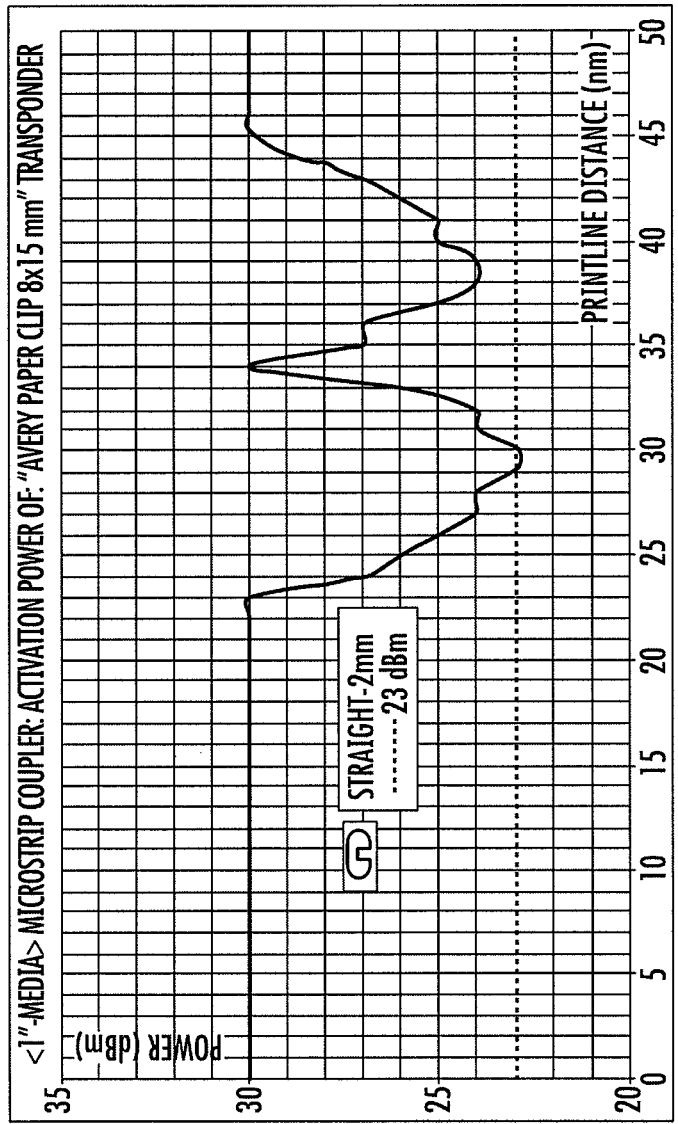
FIG. 9 is a graphical illustration of the power level for activating the loop-type transponder of FIG. 8 as a function of distance from a printline.

In an edge-justified system, as illustrated in FIG. 8, the transponder 812 may be off-set from the center of the near-field antenna 850 such that communication between the transponder 812 and the near-field antenna 850 may require relatively higher power levels as illustrated in FIG. 9. Acceptable power levels may be determined based on one or more factors including, but not limited to, the power level available from the reader and regulations or laws limiting maximum power levels. Moreover, rather than focusing on a particular power level, one factor that may be considered is relative power levels. For example, as illustrated in FIGS. 7 and 9, it takes more power to activate a loop-type transponder in an edge-justified system than a center-justified system.

Figure 10:
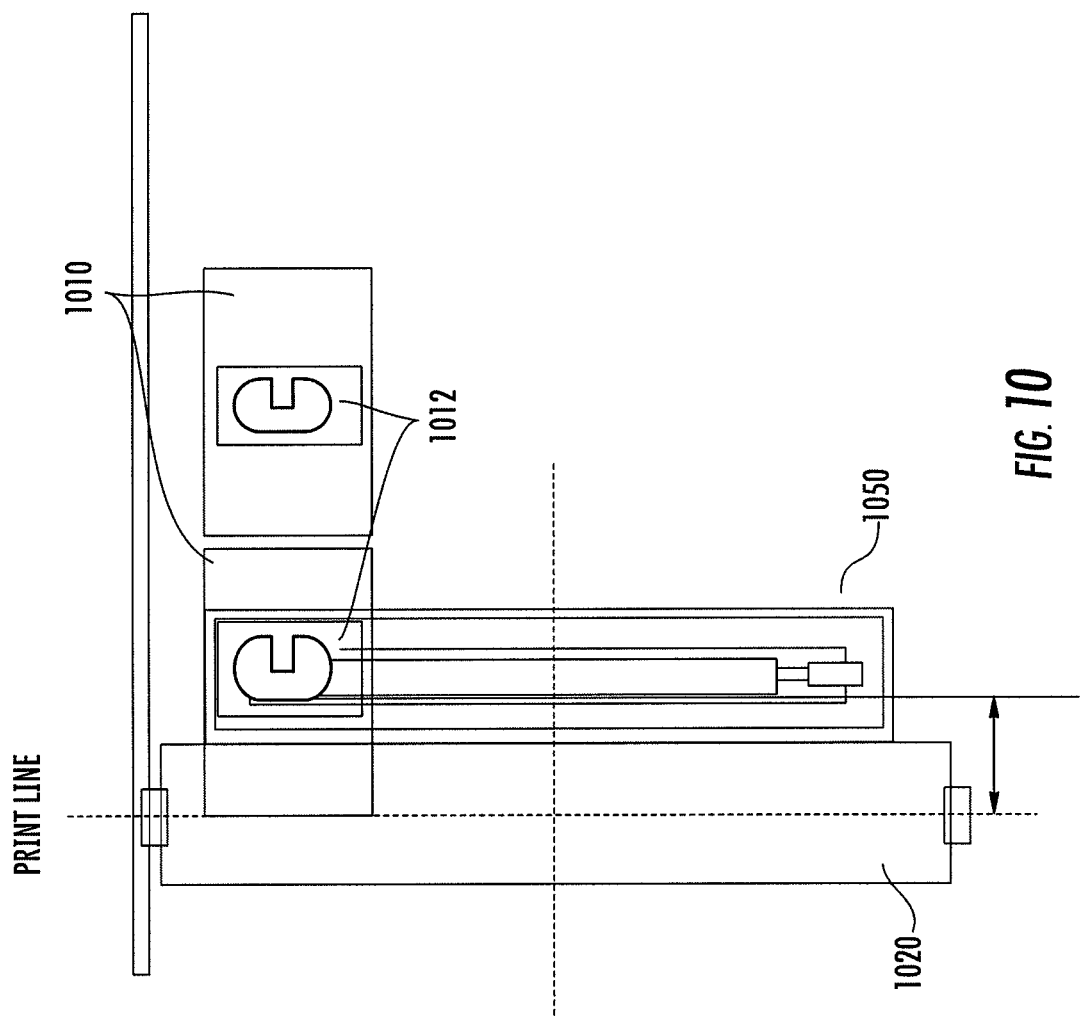
FIG. 10 is a simplified top view of a loop-type transponder and a coplanar waveguide near-field antenna in a printer-encoder having an edge-justified system.
Figure 11:
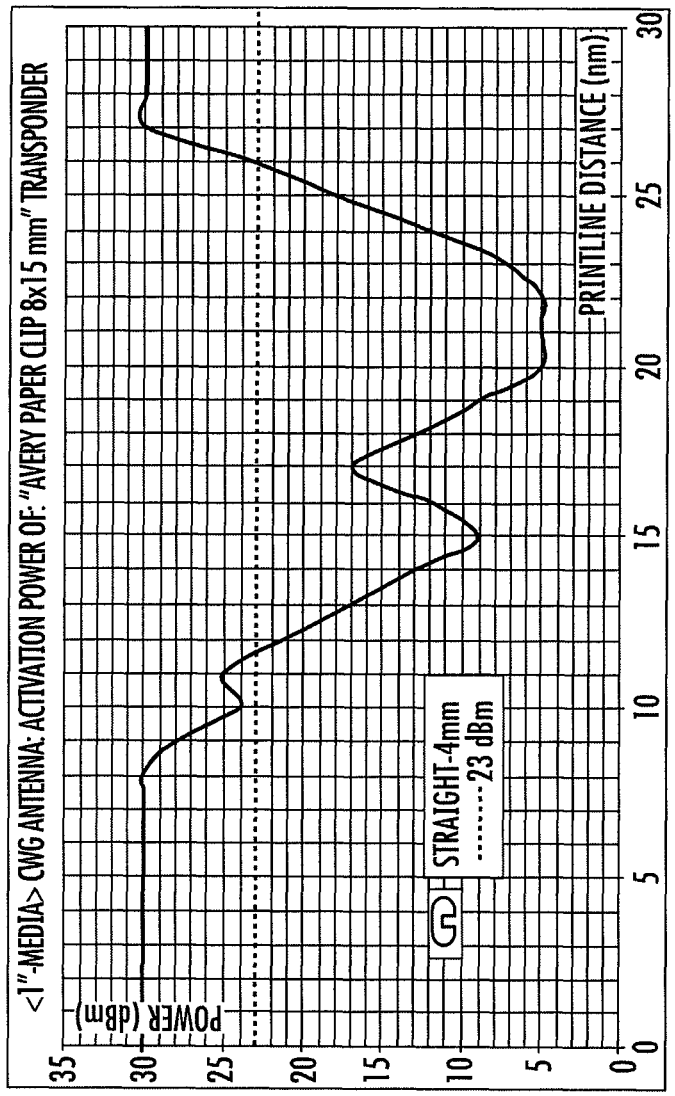
FIG. 11 is a graphical illustration of the power level for activating the loop-type transponder of FIG. 10 as a function of distance from a printline.

A near-field antenna based on a coplanar waveguide 250 has extended magnetic field components along its edges (i.e., along the entire length of the conductive strip) as illustrated in FIG. 2c. Loop-type transponders, which are mostly an IC matching loop, are practically sensitive only to the magnetic component of an electromagnetic field. As the transponder passes over the edges and slots of the coplanar waveguide near-field antenna 250, the magnetic flux may intersect the transponder and induce voltage and current sufficient to energize the transponder and provide reliable communication. Moreover, as illustrated in FIGS. 10 and 11, the coplanar waveguide near-field antenna 1050 may provide reliable communication with a small loop-type transponder 1012 even in an edge-justified system at relative low power levels (e.g., 10-15 dBm) compared to a microstrip near-field antenna.

In order to achieve RF power efficiency, an antenna based on a half wavelength microstrip or stripline transmission line is typically configured to have a characteristic impedance lower then a terminating load impedance. In general, the higher impedance ratio creates a higher standing wave ratio ("SWR"). The width of a conductive strip is the most influencing impedance parameter among other antenna parameters. The width of the conductive strip has an inverse relationship with the characteristic impedance. Therefore, a lower characteristic impedance of the conductive strip can be achieved by increasing the width of the conductive strip.

However, the transponder encoding area is also dependent of the width. Widening the conductive strip for a higher SWR may also extend the transponder encoding area such that the area is longer than one media unit. A transponder encoding area longer than one media unit may create situations in which more than one transponder is activated at the same time or increase a minimum media unit length, which, as explained above, is an undesirable outcome.

Figure 15A:
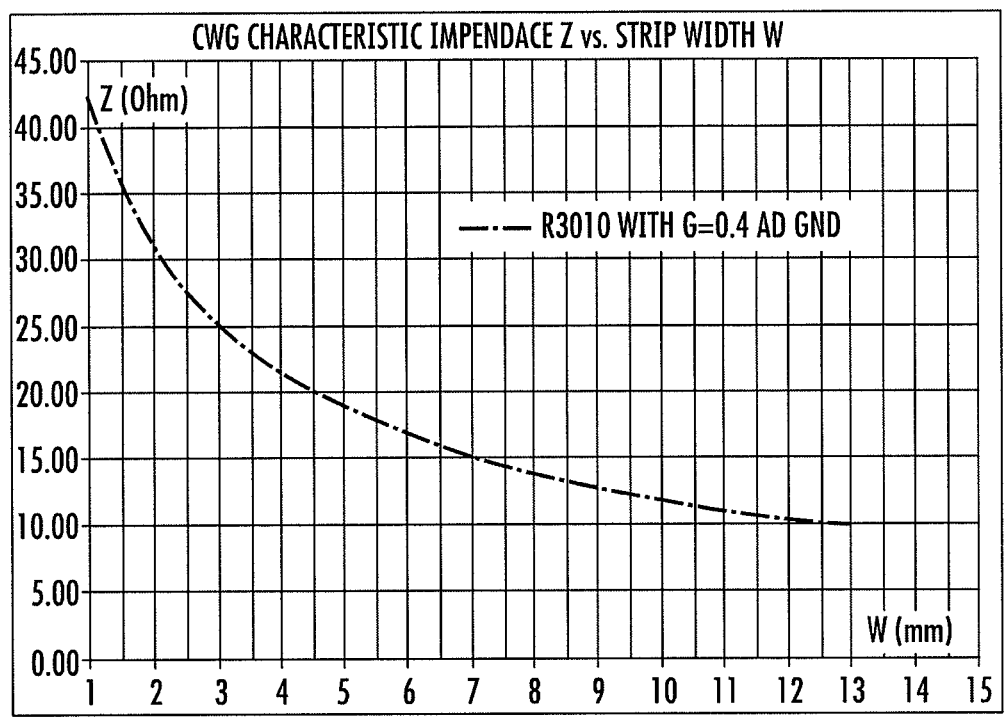
FIG. 15a is a graphical illustration of the characteristic impedance of a conductive strip of a coplanar waveguide as a function of width of the conductive strip.
Figure 15B:
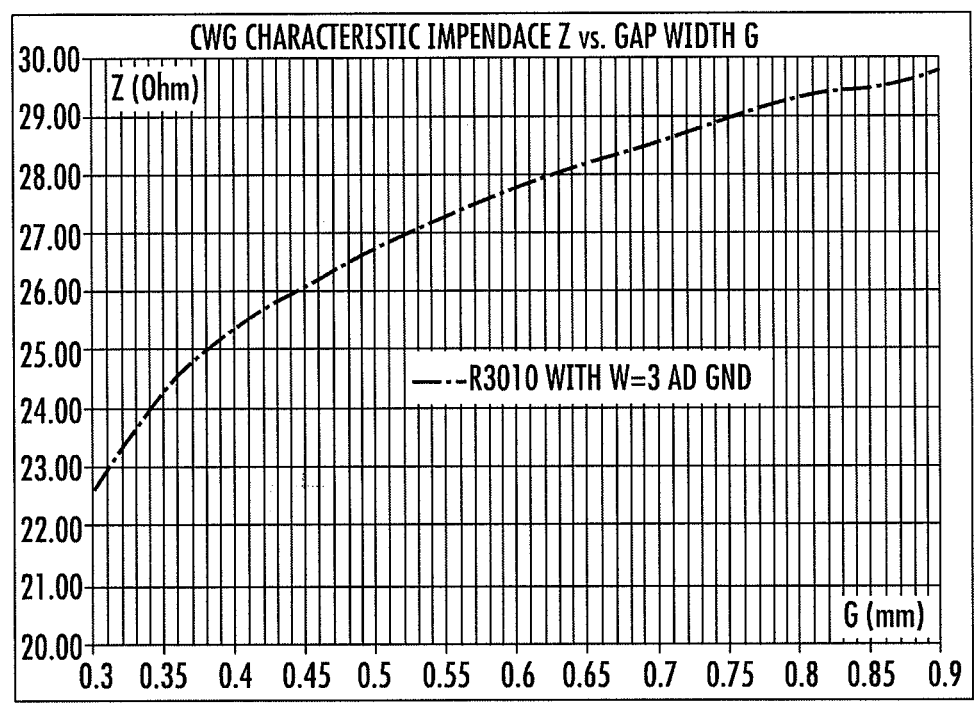
FIG. 15b is a graphical illustration of the characteristic impedance of a conductive strip of a coplanar waveguide as a function of width of the gap of the coplanar waveguide.

The characteristic impedance of a near-field antenna based on a half wavelength coplanar waveguide is dependent on the width of the conductive strip and the width of the slots. As illustrated in FIGS. 15a and 15b, the width of the slots is a more predominate factor compared to the width of the conductive strip.

Therefore, unlike near-field antennas based on the microstrip or stripline transmission line, a near-field antenna based on coplanar waveguide may achieve a high SWR without an increase of a conductive strip width. For example, a near-field antenna based on a coplanar waveguide having a terminating load of 50 ohms to simplify antenna port impedance matching and a characteristic impedance of 23 Ohms achieved by having a gap width of 0.31 mm and a strip width of 3 mm creates a SWR of approximately 2.17. While a similar near-filed antenna based on a microstrip transmission line having a conductive strip width of 3 mm would achieve a characteristic impedance of almost 50 Ohm and a SWR of approximately 1.

In some embodiments, the bandwidth of the coplanar waveguide near-field antenna may be increased by implementing a tapered width for each of the slots while keeping a strip width constant. The same technique has been used to increase a bandwidth for antennas based on microstrip and stripline transmission lines as further discussed in "UHF RFID Antennas for Printer-Encoders-Part 2: Antenna Types", High Frequency Electronics, Vol. 6, No. 10, October 2007, pp. 36-45, which is authored by one of the inventors of the present application and is hereby incorporated by reference in its entirety.

Figure 12:
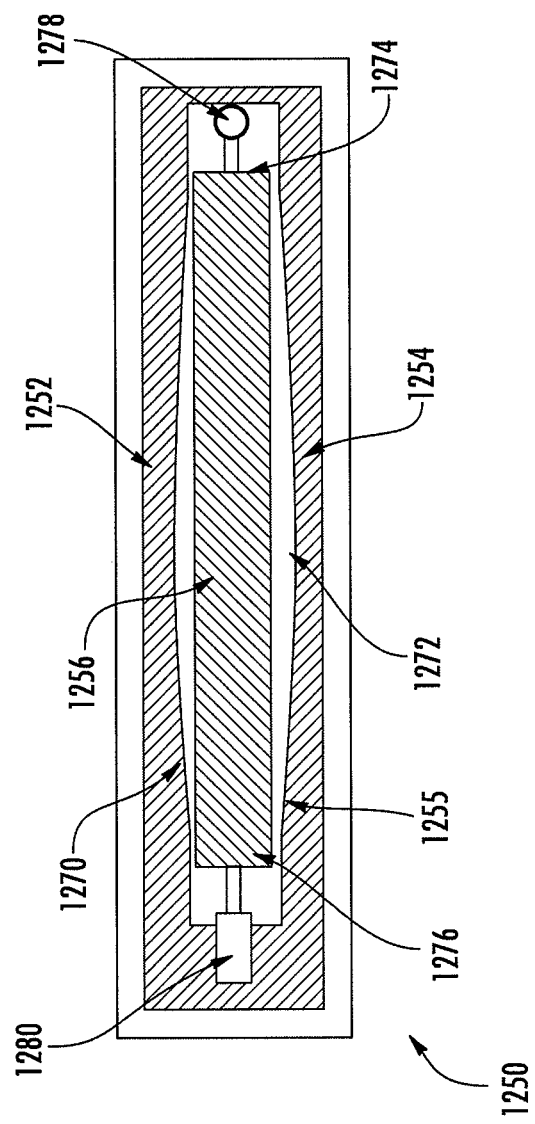
FIG. 12 is a top view of a coplanar waveguide near-field antenna according to another exemplary embodiment.

For example and as illustrated in FIG. 12, the opening 1255 defined by the space between the first and second ground planes 1252, 1254 may have a tapered shape similar to a tapered profile of a conductive strip of either a microstrip or stripline near-field antenna to increase bandwidth. Specifically, the width of each of the first and second slots 1270, 1272 increases at the same constant rate or any other function of width/distance rate from the signal end 1274 to the center and back to the loaded end 1276.

As mentioned before, in some instances, it may be desirable to position the near-field antenna near the printhead to facilitate a compact design of the entire system. In a printer-encoder, minimizing the distance between the printline and the near-field antenna may be limited due to the structure and dimensions of the platen roller.

In order to address this limitation, a novel ribbon guide and near-field antenna assembly for a printer-encoder is provided. FIGS. 13a, 13b and 13c illustrate an exemplary embodiment of such an assembly 1300. The assembly 1300 includes a ribbon guide 1310 and a near field antenna 1350. As best shown in FIG. 13c, the ribbon guide 1310 is configured to guide or direct the thermal ribbon 1312 between the printhead 1314 and a platen roller 1320 such that the printhead 1322 can heat up and press a portion of the ribbon 1312 against the media unit 1324 located between the platen roller 1320 and the printhead 1322. The ribbon guide 1310 includes a recessed portion 1326 configured to receive the near-field antenna 1350. The assembly 1300 allows for a compact arrangement between the printhead 1322, the ribbon guide 1310, the platen roller 1320, and the near-field antenna 1350.

The operating frequency or operating frequency band of the near-field antenna and the transponders discussed herein may vary. As an example, the near-field antenna and the transponders may be configured to operate in ultra high frequencies ("UHF") (i.e., 300 MHz-3 GHz) or super high frequencies ("SHF") (i.e., 3 GHz-30 GHz), sometimes called the microwave band.

Figure 16:
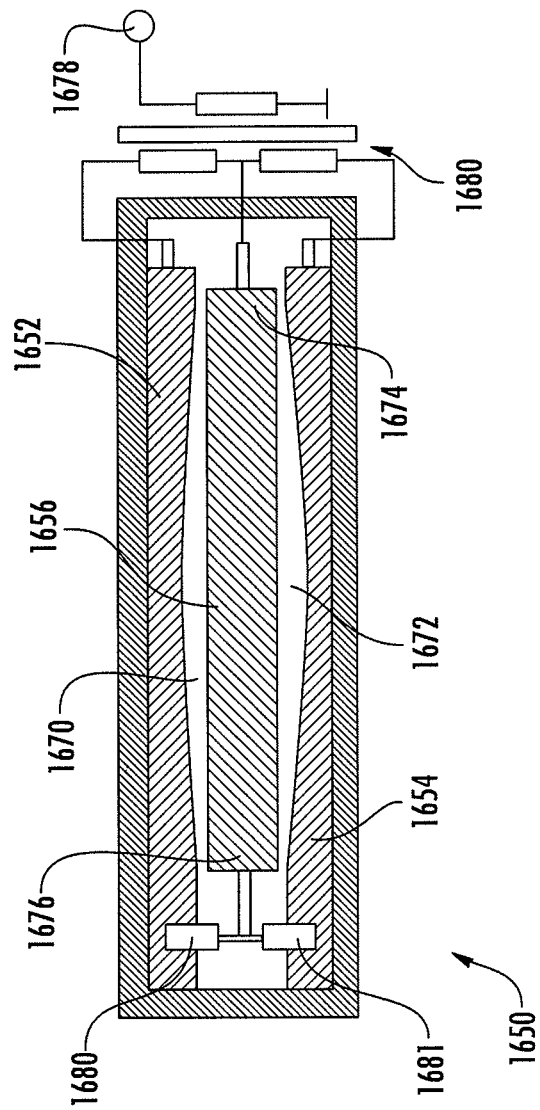
FIG. 16 is a top view of a coplanar waveguide near-field antenna according to yet another exemplary embodiment.
Figure 17:
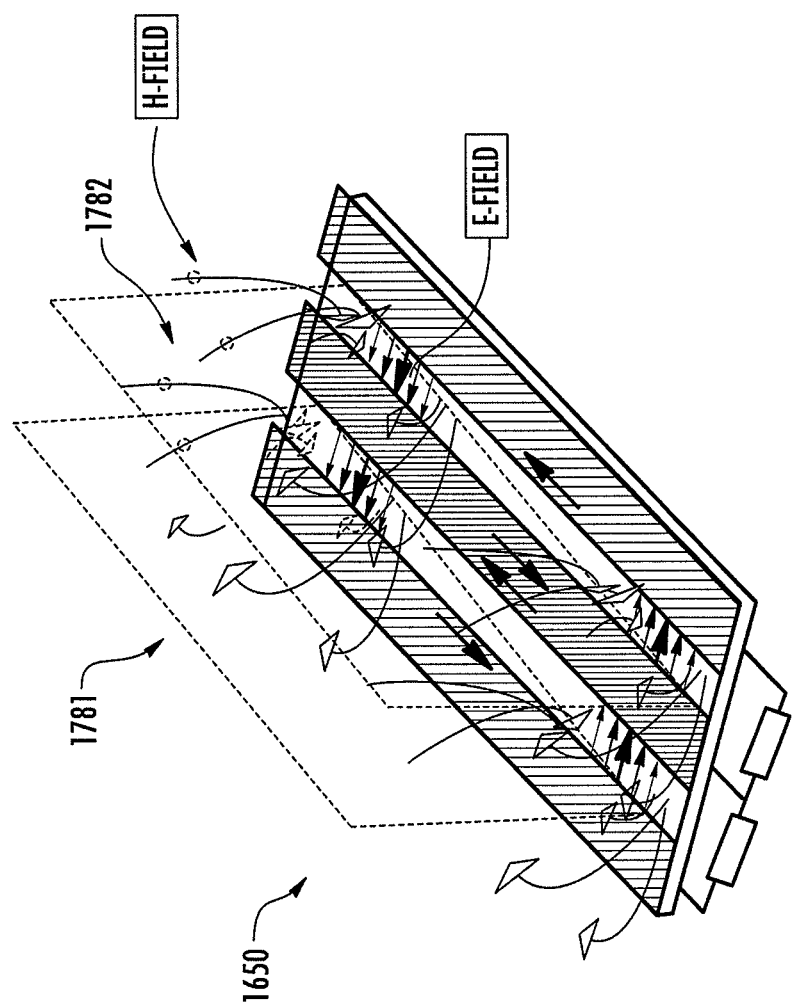
FIG. 17 is a perspective view of an electromagnetic field distribution of the near-field antenna of FIG. 16, wherein the characteristic impendence is lower than the terminating loads.
Figure 18:
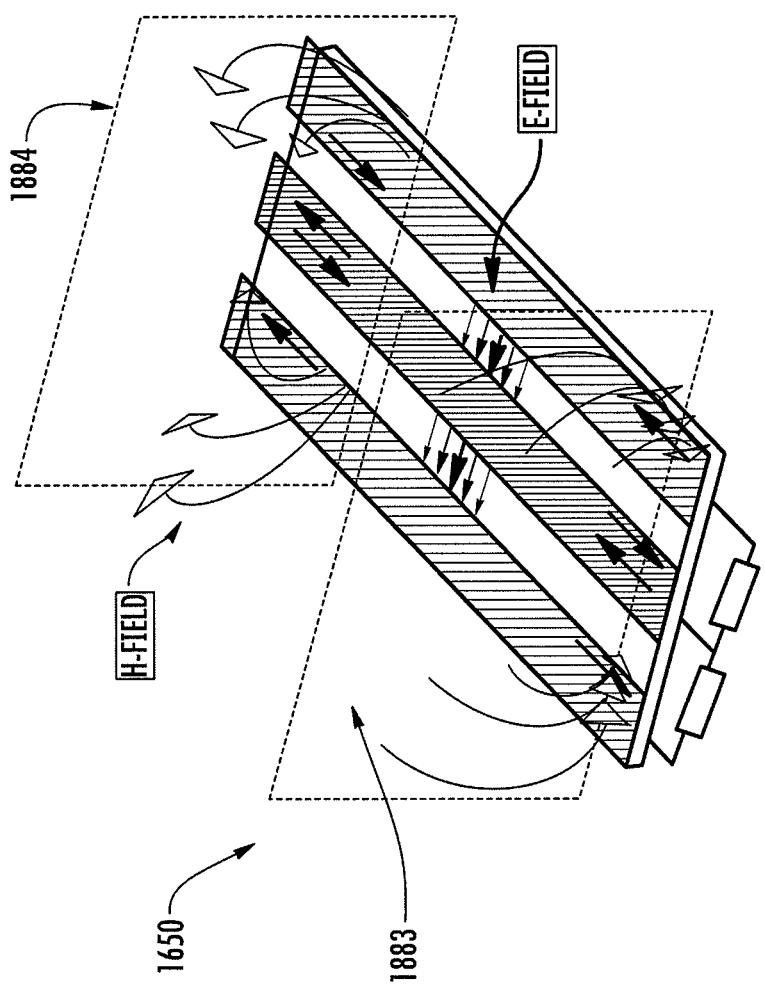
FIG. 18 is a perspective view of an electromagnetic field distribution of the near-field antenna of FIG. 16, wherein the characteristic impendence is greater than the terminating loads.

FIG. 16 through FIG. 18 illustrate additional embodiments of a near-field antenna based on coplanar waveguide. According to these embodiments, an odd feeding mode is provided for a half wavelength (or multiple thereof) near field antenna based on coplanar waveguide 1650. The near-field antenna 1650 may include a phase inverter 1680 configured to generate two signals, each 180 degrees out of phase with each other, to the conductive strip 1656 and ground planes 1652, 1654 such that the voltage applied between the conductive strip 1656 and the first ground plane 1652 has an inverse phase in regards to voltage applied between a conductive strip 1656 and the second ground plane 1654. As illustrated, the phase inverter 1680 may be a transformer which could also be used for impedance matching purposes.

The near-field antenna 1650 may further include a first terminating load 1680 and a second terminating load 1681. The loaded end 1676 of the conductive strip may be connected to the first ground plane 1652 via the first terminating load 1680 and connected to the second ground plane 1654 via the second terminating load 1681.

The ratio of the characteristic impedance of the near-field antenna based on a coplanar waveguide 1650 and the terminating load or loads 1680, 1681 may be configured to achieve a particular pattern of the electric and magnetic field distribution above the slots 1670, 1672 and the conductive strip 1656. Regardless on whether the characteristic impedance is greater than or less than the terminating loads, the magnetic field distribution includes a transverse component and a longitudinal component. However, as illustrated in FIG. 17, when the characteristic impedance is lower than the terminating loads, the magnetic field at each of the edges of the near-field antenna 1650 has a unipolar magnetic flux mostly concentrated in longitudinal planes 1781, 1782 and in the vicinity of the longitudinal planes 1781, 1782. In such an arrangement, a transponder encoding area for a single UHF loop type transponder (along the feeding direction) can be achieved by the parallel alignment of the UHF loop type transponder with near-field antenna based on a coplanar waveguide 1650. As illustrated in FIG. 18, when the characteristic impedance is higher than the terminating loads, the magnetic field at the edges of the near-field antenna 1650 has magnetic flux concentrated within two opposite transverse components 1883, 1884 from the ground planes. In such arrangement, the transponder encoding area (along a feeding direction) is split in two corresponding with the two transverse components 1883, 1884.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A RFID system for selectively communicating with a targeted transponder from among a group of multiple adjacent transponders, the RFID system comprising:
    a transponder conveyance system configured to transport at least one targeted transponder from a group of multiple adjacent transponders through a transponder encoding area along a feeding path; and
    an antenna configured to transmit an electromagnetic wave to the transponder encoding area for communicating with the targeted transponder, and the antenna includes at least a first ground plane, a second ground plane, a dielectric substrate, and a conductive strip,
        wherein the first ground plane and the second ground plane extend along the dielectric substrate and the conductive strip extends between the first ground plane and the second ground plane, such that first ground plane and the conductive strip define a first slot extending between the first ground plane and the conductive strip and such that the second ground plane and the conductive strip define a second slot extending between the second ground plane and the conductive strip,
        wherein the first ground plane, the second ground plane, and the conductive strip are substantially coplanar,
        wherein the antenna is configured to operate within a band of frequencies and the conductive strip defines an electrical a length substantially equal to a multiple of one-half of a wavelength of a center frequency of the band of frequencies, and
        wherein the first slot defines a distance between the conductive strip and the first ground plane, the distance varying along the length.

2. The RFID system according to claim 1 further including a reader configured to provide bi-direction communication with the targeted transponder through the antenna.

3. The RFID system according to claim 1, wherein the antenna further includes a terminating load and an RF port and the conductive strip extends from a signal end of the conductive strip connected to the reader through the RF port to a loaded end of the conductive strip connected to the terminating load.

4. The RFID system according to claim 1, wherein the first slot defines a first width profile and the second slot defines a second width profile, and wherein the first width profile and the second width profile are symmetrical along the length of the conductive strip.

5. The RFID system according to claim 4, wherein the second width varies along at least a portion of the conductive strip.

6. The RFID system according to claim 1, wherein the antenna includes a third ground plane opposite the dielectric substrate from the first and second ground planes and the conductive strip.

7. The RFID system according to claim 1, wherein the antenna further includes a phase inverter configured to generate two signals, each 180 degrees out of phase with each other, to the conductive strip and the first and second ground planes such that a voltage applied between the conductive strip and the first ground plane has an inverse phase in regards to a voltage applied between a conductive strip and the second ground plane.

8. The RFID system according to claim 1, wherein the first slot defines a slot width profile and the conductive strip defines a strip width profile, and wherein the slot width profile is at least one tenth the strip width profile.

9. The RFID system according to claim 1, wherein the antenna creates a standing wave ratio having a value of at least two.

10. The RFID system according to claim 1, wherein the dielectric substrate includes a ferrite combined with ceramic to increase permittivity and permeability to achieve miniaturization of the antenna.

11. A printer-encoder for printing and encoding a series of media units wherein at least one media unit includes at least one transponder, the printer encoder comprising:
    a printhead for printing indicia onto the media units;
    a conveyance system configured to transport a series of media units including the at least one transponder to the printhead and a transponder encoding area along a feed path in a feed direction;
    a reader configured to process one or more communication signals; and
    an antenna configured to direct the communication signals to and from the reader and the antenna is configured to communicate with the at least one transponder in the transponder encoding area and includes at least a first ground plane, a second ground plane, a dielectric substrate, and a conductive strip,
        wherein the first ground plane and the second ground plane extend along the dielectric substrate and the conductive strip extends between the first ground plane and the second ground plane such that first ground plane and the conductive strip define a first slot extending between the first ground plane and the conductive strip and such that the second ground plane and the conductive strip define a second slot extending between the second ground plane and the conductive strip,
        wherein the first ground plane, the second ground plane, and the conductive strip are substantially coplanar, the conductive strip defining a length, and
        wherein the first slot defines a distance between the conductive strip and the first ground plane, the distance varying along the length.

12. The printer-encoder according to claim 11 further comprising a platen roller and a ribbon guide, wherein the ribbon guide is configured to direct a portion of a thermal ribbon between the printhead and the platen roller and the printhead is configured to provide heat and press against the portion of the thermal ribbon again the platen roller such that indicia is formed on a media unit between the platen roller and the printhead.

13. The printer-encoder according to claim 12, wherein the ribbon guide defines a recessed portion configured to receive the antenna.

14. The printer-encoder according to claim 13, wherein the antenna further includes a terminating load and a RF port and the conductive strip extends from a signal end of the conductive strip connected to the reader through the RF port to a loaded end of the conductive strip connected to the terminating load.

15. The printer-encoder according to claim 14, wherein the first slot defines a first width profile and the second slot defines a second width profile, and wherein the first width profile and the second width profile are symmetrical along the length of the conductive strip.

16. The printer-encoder according to claim 15, wherein the second width varies along at least a portion of the conductive strip.

17. The printer-encoder according to claim 11, wherein the antenna includes a third ground plane opposite the dielectric substrate from the first and second ground planes and the conductive strip.

18. A printer-encoder for printing and encoding at least one media unit that includes a transponder, the printer encoder comprising:
a printhead for printing indicia onto the media units;
a platen roller;
a ribbon guide configured to direct a portion of a thermal ribbon between the printhead and the platen roller and the printhead is configured to provide heat and press the portion of the thermal ribbon against the platen roller such that indicia is formed on the least one media unit positioned between the platen roller and the printhead; and wherein the ribbon guide defines a recessed portion; and
an antenna positioned within the recessed portion and configured to transmit an electromagnetic wave for communicating with the transponder of the at least one media unit.

19. The printer-encoder according to claim 18,
wherein the antenna includes at least a first ground plane, a second ground plane, a dielectric substrate, and a conductive strip,
wherein the first ground plane and the second ground plane extend along the dielectric substrate and the conductive strip extends between the first ground plane and the second ground plane such that first ground plane and the conductive strip define a first slot extending between the first ground plane and the conductive strip, and the second ground plane and the conductive strip define a second slot extending between the second ground plane and the conductive strip, and
wherein the first ground plane, the second ground plane, and the conductive strip are substantially coplanar.

20. The printer-encoder according to claim 19 further including a reader configured to process communication signals, and wherein the antenna further includes a terminating load and a RF port and the conductive strip extends from an signal end of the conductive strip connected to the reader through the RF port to a loaded end of the conductive strip connected to the terminating load.

21. The printer-encoder according to claim 20, wherein the first slot defines a first width and the second slot defines a second width, and wherein the first width and the second width are symmetrical along the length of the conductive strip.

22. The printer-encoder according to claim 21, wherein each of the first width and the second width varies along at least a portion of the conductive strip.

23. The printer-encoder according to claim 21, wherein the antenna includes a third ground plane opposite the dielectric substrate from the first and second ground planes and the conductive strip.

24. A method comprising:
providing an antenna that includes at least a first ground plane, a second ground plane, a dielectric substrate, and a conductive strip,
wherein the first ground plane and the second ground plane extend along the dielectric substrate and the conductive strip extends between the first ground plane and the second ground plan; such that first ground plane and the conductive strip define a first slot extending between the first ground plane and the conductive strip and such that the second ground plane and the conductive strip define a second slot extending between the second ground plane and the conductive strip, and
wherein the first ground plane, the second ground plane, and the conductive strip are substantially coplanar;
transporting a targeted transponder of the plurality of transponders along the feed path into the transponder encoding area; and
sending one or more electrical signals to the antenna such that the conductive strip and the first slot and the second slot emit an electromagnetic wave into the transponder encoding area for communicating with the targeted transponder in the transponder encoding area,
wherein the conductive strip defines a length, and
wherein the first slot defines a distance between the conductive strip and the first ground plane, the distance varying along the length.

25. The method of claim 24 further comprising printing indicia onto a media unit, wherein the targeted transponder is attached to the media unit.

26. The method of claim 24 further comprising providing a reader connected with the antenna and configured to generate and receive the one or more electrical signals.

27. The method of claim 24, wherein the operation of transporting the targeted transponder into the transponder encoding area further includes aligning a center of the transponder with an end of the conductive strip of the antenna.

28. The method of claim 24 providing a first signal and a second signal 180 degrees out of phase with the first signal to the conductive strip and the first and second ground planes such that a voltage applied between the conductive strip and the first ground plane has an inverse phase in regards to a voltage applied between a conductive strip and the second ground plane.

* * * * *

UNITED STATES PATENT AND TRADEMARK OFFICE
CERTIFICATE OF CORRECTION

PATENT NO.         : 9,108,434 B2
APPLICATION NO.    : 11/959033
DATED              : August 18, 2015
INVENTOR(S)        : Boris Y. Tsirline et al.

Page 1 of 1

It is certified that error appears in the above-identified patent and that said Letters Patent is hereby corrected as shown below:

On the Title Page

"(73) Assignee: ZIH Corp., Lincolnshire, IL (US)" should read --(73) Assignee: ZIH Corp., Hamilton (BM)--

In the Claims

In Claim 1, at Column 13, Line 51, cancel the text "an electrical"

In Claim 24, at Column 16, Line 22, delete the text "plan;" and replace it with the text --plane;--

Signed and Sealed this
Twentieth Day of August, 2019

Andrei Iancu
*Director of the United States Patent and Trademark Office*